United States Patent [19]

Antonazzi et al.

[11] Patent Number: 4,532,809
[45] Date of Patent: Aug. 6, 1985

[54] PRESSURE MEASURING SYSTEMS WITH INCREASED ACCURACY FOR A CONSTANT RESOLUTION

[75] Inventors: Frank J. Antonazzi; Sudesh Bose, both of South Bend, Ind.

[73] Assignee: Allied Corporation, Morristown, N.J.

[21] Appl. No.: 308,751

[22] Filed: Oct. 5, 1981

[51] Int. Cl.³ .............................................. G01L 9/12
[52] U.S. Cl. ......................................... 73/701; 73/708; 73/718
[58] Field of Search ................... 73/4 R, 701, 708, 718

[56] References Cited

U.S. PATENT DOCUMENTS

| | | | |
|---|---|---|---|
| 2,869,367 | 1/1959 | Moore | 73/182 |
| 3,350,945 | 11/1967 | Bristol | 73/701 |
| 3,660,745 | 5/1972 | Bertrand | 73/701 |
| 3,790,910 | 2/1974 | McCormack | 73/4 R |
| 4,086,804 | 5/1978 | Ruby | 73/4 R |
| 4,322,977 | 4/1982 | Sell et al. | 73/701 |

*Primary Examiner*—Gerald Goldberg
*Assistant Examiner*—John E. Chapman, Jr.
*Attorney, Agent, or Firm*—Ken C. Decker

[57] ABSTRACT

A pressure parameter measurement system includes a parameter measurement loop (24, 16, 26, 28, 30, 32, 34) generating a digital signal (N1) indicative of a parameter (Pa–Pb) being measured, a common mode measurement loop (24, 22, 36, 38, 40, 42, Cfa) generating a digital signal (N2) indicative of an element (Pa) of the parameter (Pa–Pb), and a calibration circuit (46) which outputs the parameter (Pa–Pb) as a function of the digital signals (N1, N2) and a temperature signal T.

24 Claims, 18 Drawing Figures

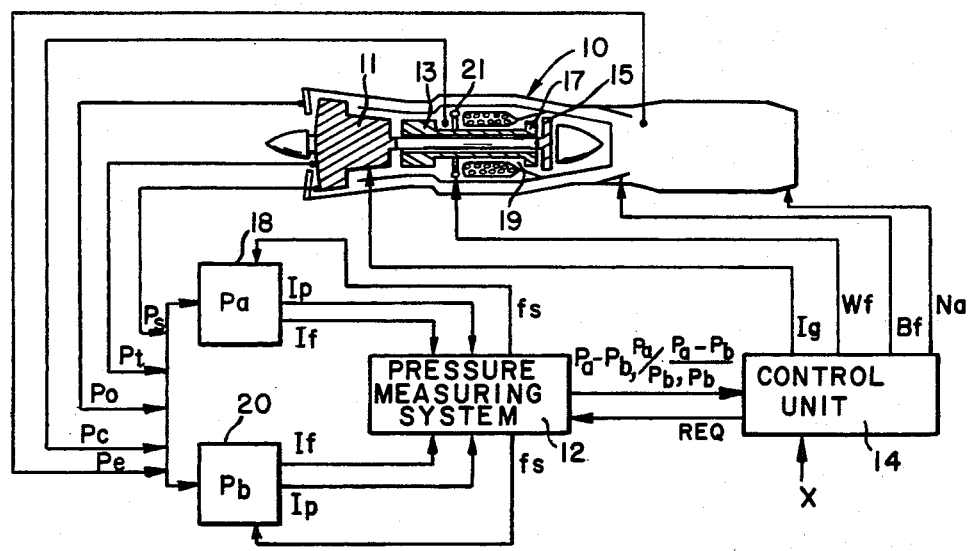
FIG. 1
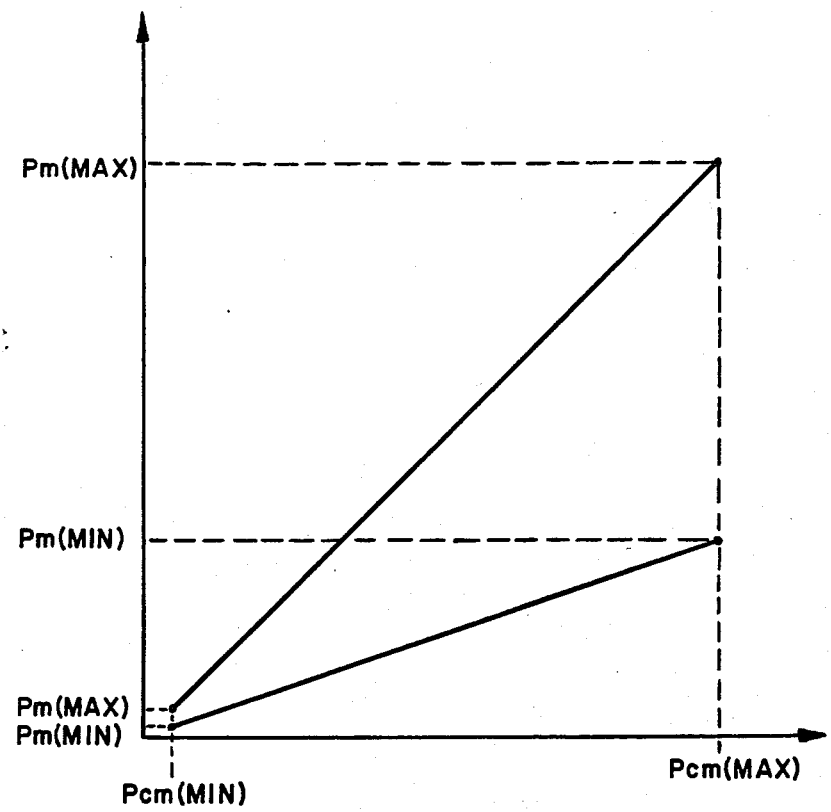
FIG. II

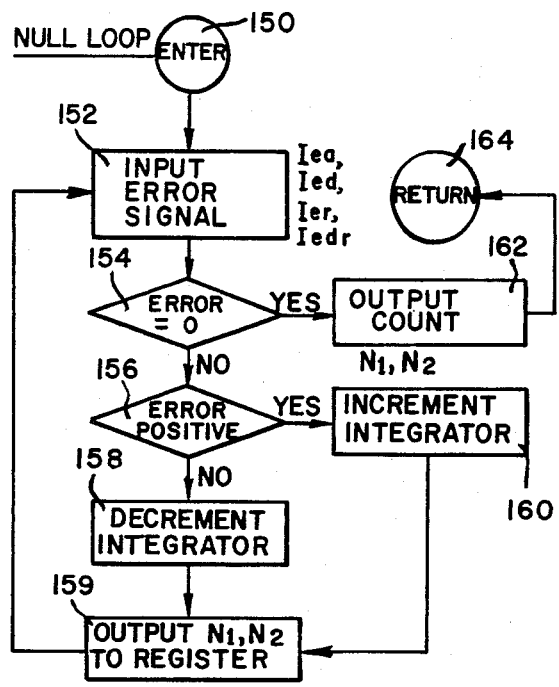
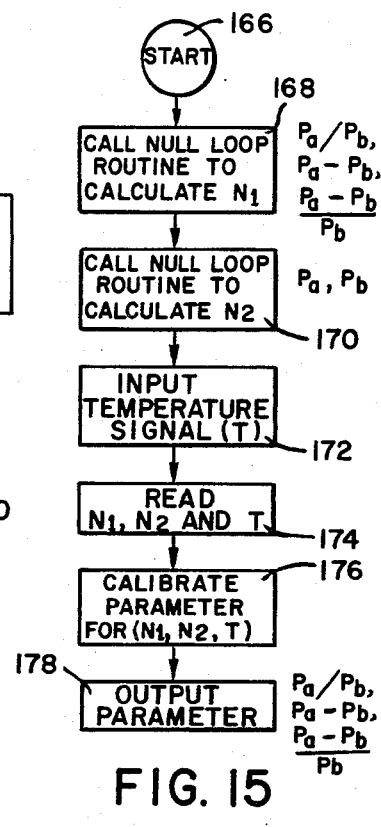
FIG. 14
FIG. 15
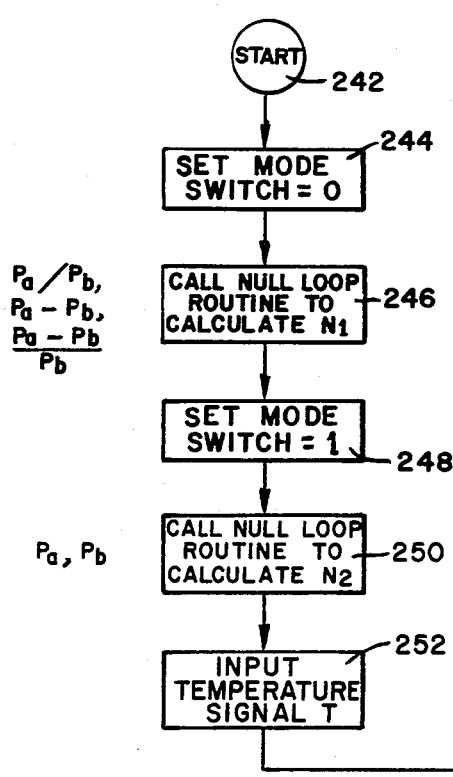
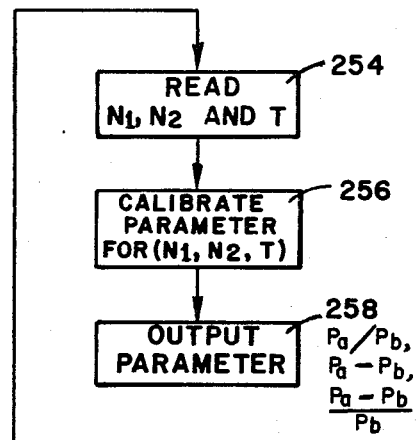
FIG. 18

PRESSURE MEASURING SYSTEMS WITH INCREASED ACCURACY FOR A CONSTANT RESOLUTION

The invention pertains generally to pressure measuring systems with increased accuracy for a constant resolution and is more particularly directed to such pressure measuring systems that utilize quartz capacitive pressure transducers in a closed loop system.

In the field of pressure measurement there are many devices known to provide an advantageous transduction of pressure into an electrical signal. These pressure transducer systems generally include a pressure sensitive element that modulates an electrical characteristic of the transducer with respect to changes in pressure. The variances in the electrical characteristic, which for example, may be a resistance, inductance, capacitance, or a similar parameter, are thereafter demodulated by an electrical circuit to generate an electrical signal as a function of the measured pressure.

One particularly advantageous absolute pressure measuring system is described in a co-pending and commonly assigned application, U.S. Ser. No. 153,129, entitled: "Pressure Measuring System" filed on May 27, 1980 and now U.S. Pat. No. 4,322,977, in the name of Robert C. Sell, John R. Sheler, and John M. Juhasz. The disclosure of Sell et al. is hereby incorporated by reference herein.

The referenced Sell et al. application discloses a highly accurate pressure measuring system which incorporates a closed loop feedback system and yields a digital output. The previously developed system comprises a pressure sensitive capacitor and a stable reference capacitor, contained within an absolute pressure sensing transducer capsule. The pressure sensitive capacitor and reference capacitor are excited by sinusoidal signals 180° out of phase with each other. The outputs of the capsule are connected to a summing junction thereby producing an input signal which is proportional to changes in the measured pressure. The summing junction generates an error signal as the difference of the input signal and a feedback signal. The error signal is thereafter amplified and processed by appropriate filters and an integrator to provide an output which excites a similar feedback transducer capsule in a negative feedback loop to another input of the summing junction. The output current or feedback signal from the feedback capsule is utilized to null the error signal or balance the input signal and is thus a measure of the pressure sensed when the summing junction output is zero.

Additionally, the feedback loop includes a digital counter for the direct measurement of the number of discrete increments of feedback signal necessary to null the output of the summing junction. The digital readout of the counter is thereby directly proportional to the desired pressure measurement. This system is quite advantageous in the measurement of a single absolute pressure.

A particularly advantageous differential pressure measuring system is described in a co-pending and commonly assigned application, U.S. Ser. No. 244,184 filed Mar. 16, 1981, now U.S. Pat. No. 4,457,179 entitled, "Differential Pressure Measuring System", in the names of Frank J. Antonazzi and Joseph A. Bluish. The disclosure of Antonazzi et al. is hereby incorporated by reference herein.

The referenced Antonazzi, et al. application discloses a highly accurate differential pressure measuring system which incorporates a closed loop feedback system and yields a digital output. The previously developed system comprises a first quartz capacitive capsule having a pressure sensitive capacitor for measuring the change in one absolute pressure, a second quartz capacitive capsule having a pressure sensitive capacitor for measuring the change in another absolute pressure, an alternating source of excitation voltage feeding one capsule in phase and the other capsule 180° out of phase with the other, and means for summing the outputs of the capsules such that an error signal is formed. The system further includes a multiplier whose output is used to excite a feedback capacitor connected in a closed loop manner back to another input of the summing junction and thereby null the error signal. The gain of the multiplier is controlled by the magnitude of the output of an integrator which generates the time integral of the error signal. The integrator output is then a function of the excitation level required to produce a nulled error signal and hence is a function of the applied differential pressure.

Yet another advantageous pressure measuring system is disclosed in a copending and commonly assigned U.S. application Ser. No. 280,578, entitled "Pressure Ratio Measuring System" filed on July 6, 1981, now U.S. Pat. No. 4,434,664, in the name of Frank J. Antonazzi. The disclosure of Antonazzi is hereby expressly incorporated by reference herein.

The referenced Antonazzi application discloses a highly accurate pressure ratio measuring system which incorporates a closed loop feedback system and yields a digital output. Preferably, two or three quartz capacitive transducers are arranged in an impedance configuration to produce an error signal which is proportional to a ratio or differential ratio of pressure. The error signal is subsequently converted into a digital number by means of a closed loop similar to those described in the referenced Antonazzi et al. application and the referenced Sell et al. application. The conversion is accomplished by nulling the error signal at which time the digital number is proportional to the measured parameter.

Additionally, in the referenced Sell et al. application and the referenced Antonazzi et al. application, it was taught how to increase the accuracy of such measuring systems by compressing the digital count of the integrator as a function of the absolute pressure or the differential pressure. This technique accomplished an increase in accuracy so that a fixed percent of a point error is obtainable over the entire range of pressure measurement without having to increase the resolution capability of the systems. This technique is extremely advantageous in an absolute pressure measuring system and highly useful in a differential pressure measuring system.

However, with the differential pressure, pressure ratio, and differential pressure ratio measuring systems mentioned above, not only can the parameters vary between a minimum and maximum value, but also the range between the minimum and maximum values may change with respect to a common mode pressure. In this regard, a common mode pressure is defined as one that is a component of the differential pressure, pressure ratio, or differential pressure ratio. It is not uncommon for the range of these pressure parameters to increase with an increase in a common mode pressure.

To relate the problem to a specific use, reference is directed to the control of gas turbine engines which utilizes these types of pressure parameters to calculate engine control variables. For example, if the pressures being measured are the total inlet pressure Pt and the static inlet pressure Ps of a gas turbine engine, then the differential pressure (Pt-Ps) is an indication of airflow into the engine.

Additionally, the differential pressure ratio (Pt-Ps)/Pt is an indication of the Mach number that the engine is experiencing. If the pressures being measured are the total inlet pressure Pt and the exhaust pressure Pe of a gas turbine engine, then the pressure ratio, Pt/Pe, is by definition the engine pressure ratio (EPR).

In the above calculation of the parameters for airflow, Mach number, and EPR, it is known in actual engines that the range between the maximum and minimum values of the parameters generally increase as a function of the increasing common mode pressure. In the case of airflow and Mach number, the range increases as the common mode pressure Pt while in the case of EPR the range increases as the common mode pressure Pe.

It is evident for a measurement system to maintain a high percentage accuracy for a pressure parameter over these changing range requirements would occasion a very high resolution system with a large number of digital bits. Therefore, it would be highly desirable to be able to maintain high accuracy as a fixed percentage of a range at a particular common mode pressure while reducing the number of bits in the system and using a constant resolution requirement for the system.

SUMMARY OF THE INVENTION

Accordingly, the invention provides a pressure measurement system with a fixed percentage accuracy and a constant resolution over a changing range requirement. The system includes a pressure parameter measurement loop, a common mode pressure measurement loop, and a calibration arrangement that outputs the measured pressure parameter as a function of the measured pressure parameter and the common mode pressure.

By measuring the common mode pressure, the calibration arrangement is apprised of the particular range over which the pressure parameter will vary. The system can then use the maximum constant resolution available in the system for each range at each particular common mode pressure. With this technique the system can increase the accuracy in the ranges at the lower end of the common mode pressure without having to increase the resolution and bit size of the system at the higher ranges. This will provide a system yielding a fixed percent of point accuracy over the entire range of the pressure parameter with less digital bits.

In a first preferred embodiment of the invention, the pressure parameter measurement loop comprises a closed loop differential pressure measuring system including at least two quartz capacitive pressure transducers. This embodiment further includes a closed loop absolute pressure measuring system having at least one quartz capacitive pressure transducer as the common mode pressure measurement loop. The calibration arrangement of this embodiment received inputs from the pressure parameter measurement loop and the common mode pressure measurement loop to output a measurement signal as a function of the differential pressure and the common mode pressure.

In a second preferred embodiment of the invention, the pressure parameter measurement loop comprises a closed loop pressure ratio measuring system including at least two quartz capacitive transducers. In a third preferred embodiment of the invention, the pressure parameter measurement loop comprises a closed loop differential pressure ratio measuring system including at least three quartz capacitive transducers.

A second implementation for the first, second, and third embodiments comprises a closed loop absolute pressure measurement system including at least one quartz capacitive pressure transducer configured in the feedback loop. This provides a pressure sensitive feedback signal which compresses the digital count of this loop as a function of pressure. In this manner, the accuracy of the measurement of the common mode pressure is increased and the overall system accuracy increased. Similarly, the second implementation of the first embodiment additionally includes a quartz capacitive transducer in the feedback loop of the closed loop differential pressure measuring system for the same reason.

A third implementation for the first, second, and third embodiments of the invention includes a means for switching an input signal and a feedback signal between the pressure parameter measuring loop and the common mode pressure loop. The third implementation, measures the pressure parameter by switching to an input impedance configuration adapted to measure the particular parameter and nulls the pressure parameter measurement loop by switching a feedback signal to the feedback impedance configuration of that loop. The common mode pressure is then measured by switching to an input impedance configuration adapted to measure the common mode pressure and then nulling the common mode pressure measurement loop by switching the feedback signal to the impedance configuration of that loop. The third implementation provides for the multiplexing of many common elements of the system with an overall reduction in elements and circuit complexity.

These and other objects, features, and aspects of the invention will be more clearly understood and better described if a reading of the detailed description is undertaken in conjunction with the appended drawings, wherein:

BRIEF DESCRIPTION OF THE DRAWINGS

FIG. 1 is a system block diagram of a control system for a gas turbine engine utilizing a pressure parameter measuring system constructed in accordance with the invention;

FIG. 11 is a graphical representation of a pressure parameter range requirement as a function of a common mode pressure;

FIGS. 14, 15 are a system flow chart of the program stored within the sequencer illustrated in FIGS. 2-7;

FIGS. 14, 18 are a system flow chart of the program stored in the sequencer illustrated in FIGS. 8-10.

DETAILED DESCRIPTION OF THE PREFERRED EMBODIMENTS OF THE INVENTION

Figure 2:
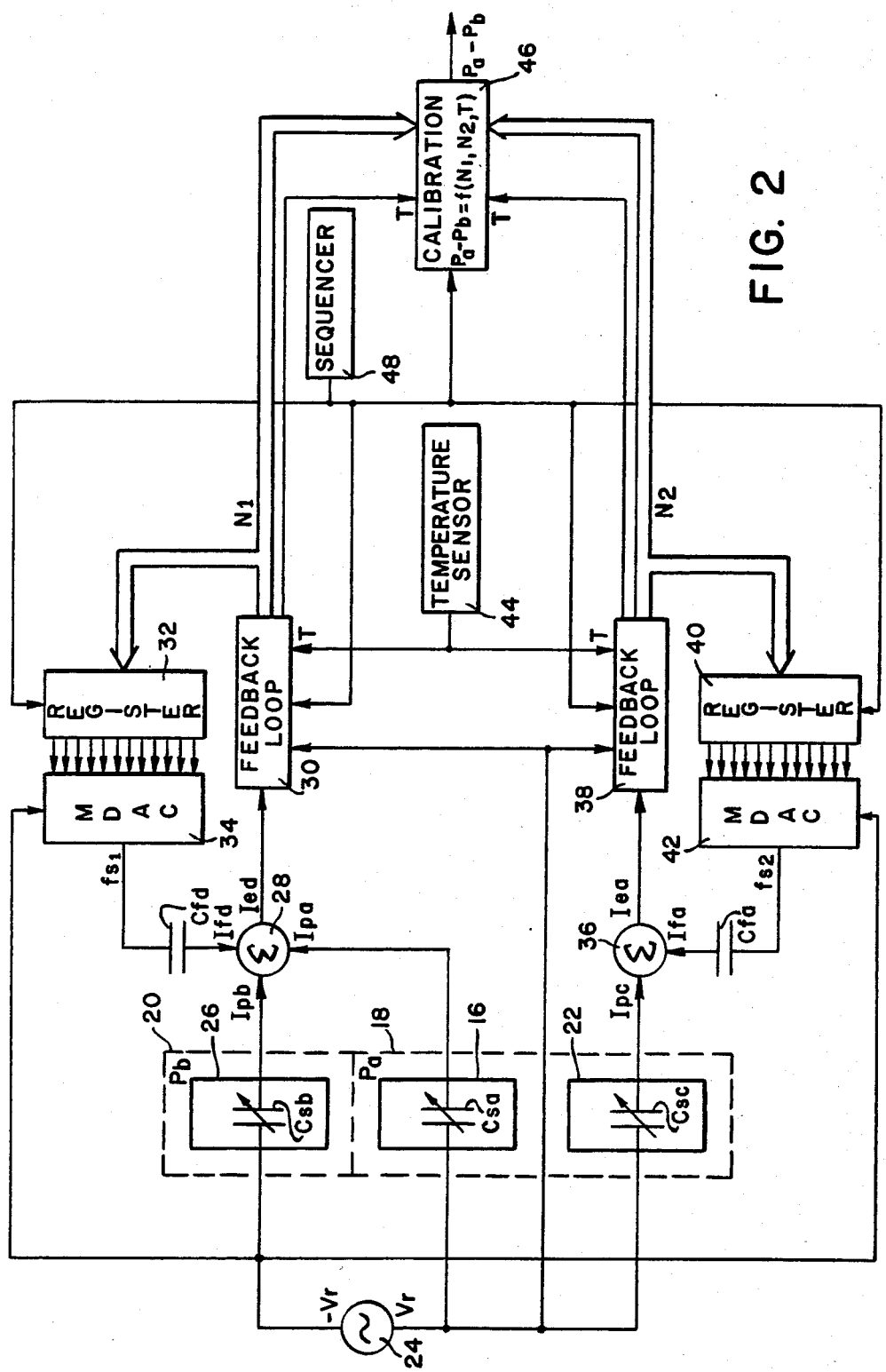
FIG. 2 is an electrical schematic view in block diagram form of a first embodiment of the pressure parameter measurement system illustrated in FIG. 1 which measures a differential pressure.

With respect now to FIG. 1, there is illustrated a conventional gas turbine engine 10 of the turbo fan type. The engine 10 comprises two compressors 11, 13 of the axial type which are powered by a set of attached turbines 15, 17, respectively. The turbines are rotated by the expansion of a burning fuel/air mixture. The fuel/air mixture is combusted in a combustion chamber 19 which receives densified air from the compressors 11, 13 and fuel from a fuel ring 21. In this type of reaction engine the energy not expended in driving the turbines is exhausted from a nozzle to produce a thrust. Additionally, a portion of the air drawn into the lower pressure compressor 11, or fan portion, is diverted around the combustion section for mixture with the exhaust gases before reaching the nozzle.

Typically, there are a number of pressures to be measured that are useful in controlling this type of engine. The pressures include the ambient pressure Po, the total inlet pressure Pt, the inlet static pressure Ps, the engine exhaust pressure Pe, and the compressor pressure Pc. The typical stations where the pressures are available on the engine 10 have been illustrated at various points on the engine by a dot. It is known in the art that other pressures associated with the engine can be advantageously used in controlling a gas turbine engine and those illustrated have been shown only for exemplary purposes.

The invention is a pressure measuring system 12 which generates an electrical signal, preferably in digital format, to a generalized control unit 14. The electrical signal, depending upon the embodiment of the invention chosen, is a measure of either a pressure ratio Pa/Pb, a differential pressure Pa-Pb, or a differential pressure ratio (Pa-Pb)/Pb corresponding to the pressures (Pa, Pb) of a chamber 18 and a chamber 20. Any of the aforementioned pressures can be communicated by suitable conduits to either of the chambers 18 and 20 to produce these pressure parameters. The pressure measuring system 12 in response to a request signal REQ from the control unit 14 transforms current signals Ip, If into the pressure parameter chosen. The current signals Ip, If are generated from input and feedback impedance configurations of one or more transducers contained within the chambers 18, 20. Depending upon which implementation of an embodiment of the invention is chosen, the current signals If are in response to feedback signals fs. Consequently, many desirable engine control parameters can be calculated directly for input to the control unit 14. These include the indications of air flow, Mach number, and EPR.

These pressure parameters, when transmitted to the control unit 14, are operated on by generalized control laws to generate engine control signals. Typical, but not inclusive of the engine control signals that can be generated are signals Ig indicative of the position of the guide vanes of the low pressure compressor, Wf indicative of the fuel flow to the engine, Bf indicative of the position of the bypass flow nozzle, and Na indicative of the nozzle area. Conventionally, many other engine control variables can be calculated in this manner from the pressure parameters, either alone, or in combination with other engine operating parameters X.

The first embodiment of a pressure parameter measuring system 12 with increased accuracy which has been constructed in accordance with the teachings of the invention will now be more fully described with reference to FIG. 2. The invention will be described in the context of a pressure measuring system using pressure sensitive quartz capacitive transducers as the parameter measuring elements.

The system includes a frequency generator 24 which generates alternating excitation signals, Vr, −Vr at a certain frequency and amplitude. The excitation signals Vr, −Vr are preferably of the same amplitude and frequency but of opposite phase. These signals could, for example, be generated by a sinusoidal generator connected to the primary of a transformer having a secondary winding with a grounded center tap. With such a configuration excitation Vr would be formed between the center tap and one pole of the secondary winding while excitation −Vr would be formed between the center tap and the other pole of the secondary winding.

The excitation signals Vr, −Vr feed a first pressure sensing capsule 16, a second pressure sensing capsule 22, and a third pressure sensing capsule 26. Pressure sensing capsule 16 includes a pressure sensitive capacitance Csa and similarly pressure sensitive capsules 22 and 26 include pressure sensitive capacitances Csc, Csb, respectively. Preferably each capsule 16, 22, and 26, is a quartz capacitive transducer. A capacitive pressure transducer of this type is more fully disclosed in a commonly assigned U.S. Pat. No. 3,858,097 issued to Polye, the disclosure of which is hereby expressly incorporated by reference herein. Each of the pressure capsules are mounted in one of the pressure chambers 18 and 20 of the system which communicate the pressures Pa and Pb, respectively. Particularly, in this embodiment capsules 16, 22 are mounted in chamber 18 and capsule 26 is mounted in chamber 20. Conventional mounting techniques are utilized for exposing the capsules to the pressures in chambers 18 and 20. Thus, capsules 16 and 22 are exposed to the pressure Pa and capsule 24 is exposed to the pressure Pb.

The pressure sensitive capacitor Csa when fed by the excitation Vr develops a current Ipa proportional to its capacitance. Similarly, capacitor Csb develops a current Ipb proportional to its capacitance and capacitor Csc forms a current Ipc proportional to its capacitance due to the excitation of −Vr, Vr, respectively. It is evident that the currents Ipa, Ipb, and Ipc will change in a proportional manner to the pressure changes in Pa and Pb because of the capacitve changes in the sensors.

The currents Ipa, Ipb are subsequently combined in a summing junction 28. However, since the pressure sensitive capacitor Csa is fed 180° out of phase with the pressure sensitive capacitor Csb, the output of the summing junction 28 will be an alternating error current Ied which is the difference between the term (Ipa-Ipb) and a feedback current Ifd. Assuming for the moment, that the current Ifd is zero, the error current Ied is then proportional to the differential pressure Pa-Pb. This pressure parameter, the differential pressure (Pa-Pb) is the parameter measured by the first embodiment.

The error current Ied is input to a feedback loop 30 which integrates the error current Ied to form a first digital number N1. During integration the digital number N1 is fed back to a register 32 which has its outputs connected to a multiplying digital to analog converter (MDAC) 34. The MDAC 34 is additionally fed by the excitation −Vr which is its nominal output. The digital number in the register changes the gain of the MDAC 34 to output an alternating feedback signal fs1 to a fixed reference capacitor Cfd. The feedback signal fs1 is of the same frequency and phase as the excitation signal −Vr but its amplitude varies as a function of the digital number N1. The output of capacitor Cfd, the feedback current Ifd, is a function, therefore, of the feedback signal amplitude and thus a function of the digital number N1.

In operation, the feedback loop 30 increments or decrements the digital number N1 to provide enough feedback current Ifd to null the error current Ied. When the error current is nulled, the digital number N1 will be representative of the differential pressure Pa-Pb. This portion of the system operates as a pressure parameter measurement loop similar to the system taught in the referenced Antonazzi et al application.

Similarly, the current Ipc representative of the pressure Pa is input to another summing junction 36. The summing junction 36 differences the current Ipc with a feedback current Ifa and outputs an error current Iea. Assuming that the feedback current Ifa is zero, then the error current Iea is proportional to the absolute pressure Pa. A second feedback loop 38 receives as an input the error current Iea and integrates the current to form a digital number N2 which is fed back to a register 40. The register 40 is connected to a second multiplying digital analog converter 42. An additional input to the MDAC 42 is the excitation −Vr which is its nominal output. MDAC 42 generates a second feedback signal fs2 proportional to the digital number N2 which is fed to fixed capacitance Cfa. As was the case for the first feedback loop, the error current Ifa or output of the capacitance Cfa is a function of the amplitude of the second feedback signal fs2 and hence the digital number N2.

The operation of the second feedback loop 38 is similar to that of the first feedback loop 30 in that the error current Iea is integrated to increment or decrement the digital number N2 and thus generate the feedback current Ifa to null the loop. When the error current Ifa is zero, the digital number N2 will be proportional to the absolute pressure Pa. This portion of the system operates as a common mode pressure measurement loop similar to the system taught in the referenced Sell, et al. application.

The digital numbers N1, N2 subsequent to their formation are transferred to a calibration circuit 46 where values of the differential pressure Pa-Pb are stored as a function of N1, N2 and a temperature signal T. The temperature signal T is generated by a temperature sensor 44 located in physical proximity to either or both of the chambers 18, 20. The temperature signal T can be input to either of the feedback loops 30, 38 for transmission to the calibration circuit 46. The calibration circuit 46 uses the two digital numbers N1, N2 to increase the accuracy of the measurement of Pa-Pb as will be more fully explained hereinafter and subsequent to calibration with respect to the temperature signal T outputs a signal indicative of the differential pressure Pa-Pb.

The calibration process and the measurement process of the system is under the control of a sequencer 48. As is well known in the art, the sequencer can be a stored program device where a stored program in either circuitry or software provides operation sequencing to the feedback loops 30, 38, the registers 32, 40, and the calibration circuit 46.

Figure 16:
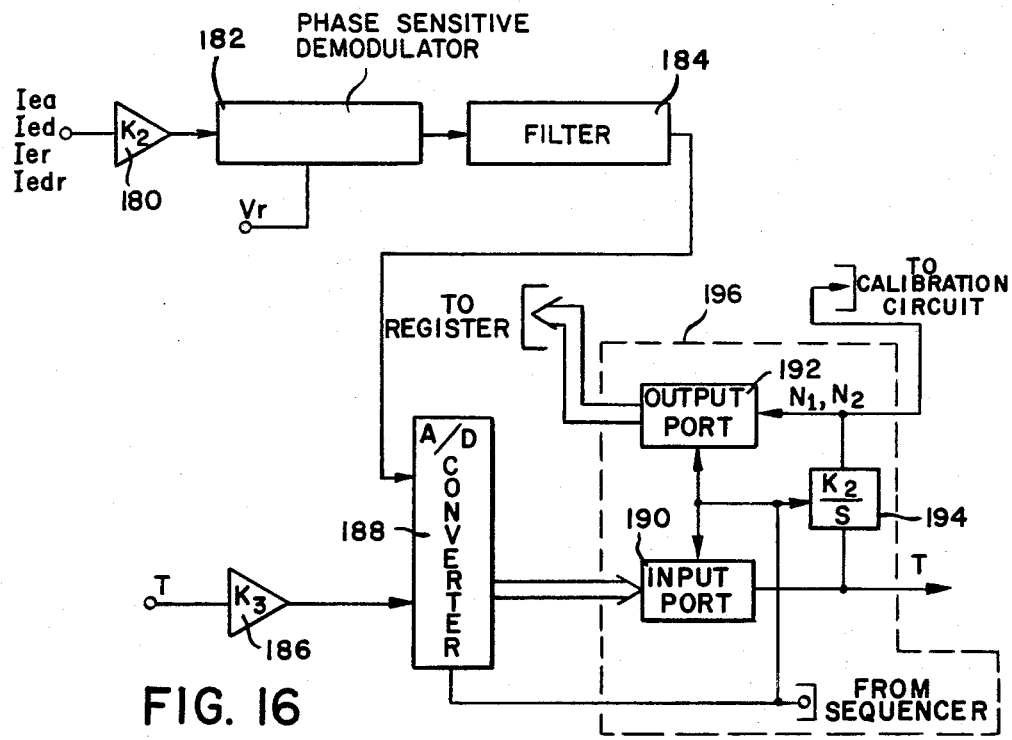
FIG. 16 is a system block diagram of the feedback loop illustrated in FIGS. 2-7.

The operation and control of the feedback loops will now be more fully described with respect to FIGS. 14, 15, and 16. These Figures disclose the method of converting the error currents Iea, Ied, into the digital numbers N1, N2 and their subsequent transmission to the calibration circuit 46. FIGS. 14, 15 are system flow charts which describe the sequencer program while FIG. 16 is a system block diagram of either the feedback loop 30 or the feedback loop 38. Therefore, the loop operation will be described for feedback loop 30 and it will be understood that feedback loop 38 contains identical elements and operates in the same manner.

With respect now to FIG. 16, the feedback loop 30 converts the error current Ied into the digital number N1. To accomplish the conversion, the error current Ied is transmitted from the summing junction 28 to a current-to-voltage amplifier 180 where it is multiplied by a gain K1. The amplitude of the alternating voltage, representing the magnitude of the error is thereafter fed to a demodulator 182 which additionally has input reference signal, Vr, from the generator 24. The error voltage output from amplifier 180 is demodulated and filtered into a DC voltage with an amplitude proportional to the error signal. The DC voltage is transmitted through a filter 184 and is thereafter input to one port of a multiplexing analog to digital (A/D) converter 188. Another input for a second port of the A/D converter 188 is the temperature signal T from the temperature sensor 44. The temperature signal T is transmitted to the A/D converter 188 after amplification by an amplifier 186 with a gain of K3.

The A/D converter 188 transforms the analog signals input to its port digital numbers that thereafter can be input to a digital processor, preferably a microprocessor, illustrated in part as dotted block 196. The block 196 could be inclined as part of the control unit 14 or be a separate element. The digital numbers are input to the processor 196 through an input port 190 under the control of the sequencer 48.

The two digital signals representative of the error and temperature are necessary to determine the pressure parameter by a calibration mapping routine as will be more fully described hereinafter. The digital form of the error signals contains information as to the sign and magnitude of the error signal. The sign of the error indicates the direction in which the feedback current Ifd must be changed to balance the system while the magnitude of the error informs the system of the amount of feedback current change necessary to be in balance. This digital error signal can be of any bit length required for the designed resolution of the system. The digital form of the temperature signal is generally of any required bit size and contains information as to the magnitude of the ambient temperature.

The input port 190 further communicates with a digital integrator 194 with a proportional gain of K2. The integrator 194 can be implemented as an internal processor register. Additionally, the input port 190 transmits the digital representation of the signal T to the calibration circuit 46. The output of the digital integrator 194 which is the digital number N1 is fed back to the summing junction through an output port 192 under the supervision of the sequencer 48 by means of the register 32.

A flow chart illustrating the process steps to control the hardware just described will now be more fully disclosed with respect to FIGS. 14 and 15. The flow chart represents the functional steps in a program stored in the sequencer 48 for converting the measured parameters into digital numbers and thereafter calibrating those numbers to output the desired pressure parameter. The program can be part of the main fuel control program where it is called as a subroutine or a separate stand-alone block where the result is output directly to the control unit 14 as described previously.

The sequence of process steps begins by receiving a request signal that starts the program at block 166. In response to the request signal the program sequences to block 168 where it calls the subroutine NULL LOOP to calculate N1. The subroutine NULL LOOP shown in FIG. 14 after being entered through block 150 begins by inputting the error signal Ied as defined by block 152. This is accomplished by signaling the A/D converter 188 that the DC error signal from the compensation circuit 184 should be converted to a digital number. After the conversion, the output of the A/D converter is transferred to a register internal to the processor 196 for storage by means of the input port 190.

The error signal which has a magnitude and sign is thereafter tested during process steps 154 and 156. The error signal is first tested in block 154 to determine if its magnitude is equal to zero. If not zero, then the digital number N1 is not yet indicative of the error signal Ied and the pressure measurement loop has not settled. Therefore, an indication of which direction to increment the number N1 must be found.

The test accomplished in block 156 provides this indication. If the error signal is positive, then the error current Ied is larger than the feedback current Ifd and integrator 50 is incremented by step 160 to increase the feedback current. If the error signal is negative, then the error current Ied is less than the feedback current Ifd and the integrator 194 is decremented by step 158 to decrease the feedback current. After either step 158 or 160 is finished, the new digital number N1 will be output to the register 32 through the output port 192 during step 159. The number N1 is thereafter fed back to vary the error current in a direction to null the loop through the MDAC 34 and the particular feedback impedance configuration—in this implementation, Cfd. This process is continued by jumping to block 152 from block 159 after the number N1 is output.

The integration rate for the integrator 194 will be a function of the program execution time and the size of the increment added to the integral sum which is stored after each pass. The sequencer can change either of these variables and thus make the integration rate variable. A variable integration rate would be advantageous for example, when it was desired that the settlement time of the loop be improved. In such case, as taught by Sell et al., the integration rate would be increased for large error currents and reduced for small error currents near the balance point.

The program will continue to vary the feedback current Ifd by increments in this manner until the error current Ied is nulled. When this occurs the sequence will flow from the test in block 154 to block 162. The sequencer will then return through block 164 to block 168 in FIG. 15. The program will then change the input parameters to the NULL LOOP subroutine and calculate N2 through feedback loop 38 in the same manner. This loop, therefore, will input the error current Iea and increment the digital number N2 in order to null the error current with the feedback current Ifa. After the subroutine has once again returned to block 170 the sequencer will signal the A/D converter 188 in either feedback loop 30 or feedback loop 38 to convert the output of the temperature sensor 28 into a digital number. The temperature signal T in digital form will then be input to the input port 190 and stored. This step in the sequence is illustrated as block 172. The system will now begin a calibration cycle where the stored values of N1, N2, and T are read during step 174 and the corresponding pressure parameter value found from a calculation accomplished by block 176.

The calibration step can be accomplished by one of two alternative methods. In the first a lookup table of the values of the numbers N1, N2, the pressure parameter, and the temperature T is composed empirically. An initial calibration is formed by exposing the system to a matrix of known pressure differentials and temperatures and recording the digital numbers N1, N2 produced for each point. Each point is placed in a memory element such as a read-only memory (ROM) to form the look-up table. The look-up table may then be used to find the pressure parameters which correspond to the measured values for N1, N2, and T during the gas turbine engine operation. If necessary an interpolation routine can be used to find the pressure parameter between two empirical points.

An alternative method is to derive from the empirical calibration data for known pressure parameters and temperatures an equation for the pressure parameter as a function of the variables N1, N2, and T. Then to obtain an indication of an unknown parameter this equation can be executed in the software loop to convert the measured variables N1, N2, and T to a representation of the unknown parameter. The pressure parameter, differential pressure Pa-Pb, is thereafter output during step 178 to be directly used by the control unit 14 or for use in a larger program or processor.

While a digital software implementation of the feedback loops has been described for indicating the preferred embodiment of the invention, it will be obvious to one skilled in the art that the feedback circuitry illustrated in the referenced Sell et al. application could just as easily be used. In such an instance feedback circuitry illustrated in FIG. 4 of that application as elements 14, 16, 26, and 28 could be readily substituted for the digital loop to take the error current Ie and convert it into a feedback signal $-Vr\,f(N)$. Moreover, the system loop could also be implemented in a totally analog configuration. In that case the loop would include analog amplification, demodulation, and integration to output an analog output signal representative of the desired parameter. The feedback loop would additionally utilize an analog multiplier controlled by the output signal to null the loop.

The system therefore comprises a first measurement system, or pressure parameter measurement loop, generating the digital number N1 which is representative of a measured pressure parameter, in this case a differential pressure (Pa-Pb) and a second measurement system, or common mode pressure measuring loop, generating the digital number N2 which is representative of one of the components of the measured parameter, namely, common mode pressure Pa.

To more clearly point out the advantage of the system, reference is now directed to FIG. 11. FIG. 11 is a graphical representation of a generalized pressure parameter Pm range requirement as a function of a common mode pressure Pcm. In this particular instance, the pressure parameter Pm is the differential pressure Pa-Pb and the common mode pressure is Pa. The requirements in this instance were obtained from the actual values that the measured physical variables can take during gas turbine engine operation. It is seen that the differential pressure range, the maximum difference between Pa and Pb, increases as the absolute pressure, Pa, increases from Pa (Min) to Pa (Max). Thus, if the accuracy of the differential pressure measurement, as a predetermined percentage of each range, is to be maintained, there will be a considerable difference in the resolution required over the entire absolute pressure range. The initial resolution requirement for a fixed percentage of point accuracy will be determined by the smallest increment of the differential range at Pa (Min) that is to be measured. Normally, for a system with fixed resolution, this will produce an excess of resolution for the differential pressure measurement at Pa (Max) and require a digital system with a large number of bits. It is highly desirable that the system maintain a fixed percentage of point accuracy while reducing the number of bits needed by the system.

According to the invention, the range and accuracy requirements can both be met by the system using a constant resolution and a reduced number of bits. The invention attains this advantage by measuring the absolute (common mode) pressure at which the differential pressure is measured. This information defines the range of the pressure parameter from the requirements plot. The calibration of Pa-Pb as a function of N1 count can then be partitioned into N2 calibrations where all use the maximum number of digital bits available for resolution. This increases the accuracy in the smaller ranges without having to increase bit size for the system.

Figure 12:
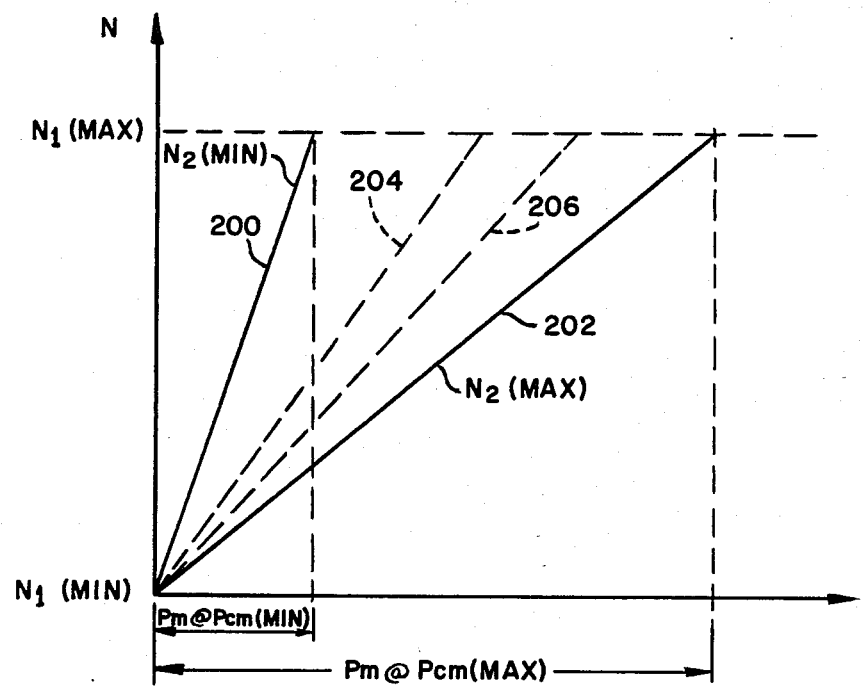
FIG. 12, is a graphical representation of a calibration schedule of a pressure parameter as a function of a digital number N1 and a common mode pressure Pcm.

With attention now directed to FIG. 12 such a calibration schedule is illustrated. The differential pressure range at Pa (Min) is calibrated along curve 200 and the differential pressure range at Pa (Max) is calibrated along curve 202. For intermediate differential pressure range between Pa (Min), Pa (Max) similar calibrations of any number N can be made as is illustrated by dotted calibration curves 204, 206. It is evident that each differential pressure range associated with a specified absolute pressure has been divided into the same number of increments, Nmax. It is their distribution over the range size that varies as a function of the common mode pressure. Because of this calibration, the resolution is constant and thus accuracy as a percentage of the differential range is identical for the different ranges. Preferably this is the calibration stored in calibration circuit 46.

Figure 13:
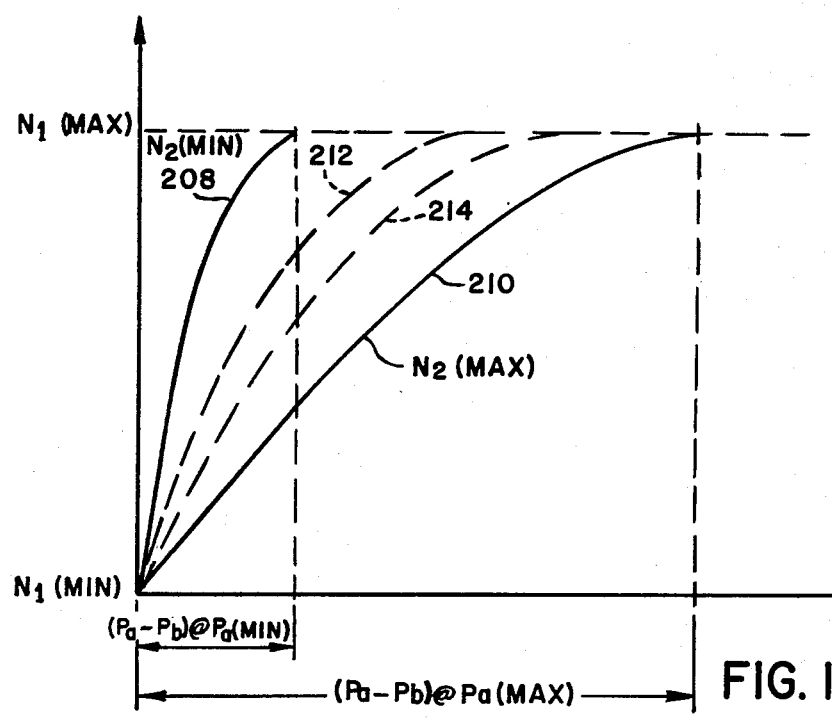
FIG. 13 is a graphical representation of a second calibration schedule of a pressure parameter as a function of a digital number N1 and a common mode pressure Pcm.

Similarly, FIG. 13 discloses a calibration of differential pressure ranges as a function of the digital number N1. The differential pressure range at Pa (Min) is calibrated as curve 208 and the differential pressure range at Pa (Max) is calibrated along curve 210. As was the case in the previous Figure, intermediate differential pressure ranges between Pa (Min), Pa (Max) are calibrated by any number of curves N2 illustrated as dotted curves 212, 214. The difference between the calibration illustrated in the FIG. 13 and that of previous FIG. 12 is the shape of each calibration curve. Each of the calibration curves 208–214 in FIG. 13 have a a larger slope at smaller differential pressures which decreases with the increasing size of the parameter measured. This point will be more fully discussed with respect to FIG. 5. As a fourth dimension to the schedule shown, the calibration circuit additionally varies the pressure parameters with respect to temperature signal T. This fourth dimension on the schedule has been eliminated from FIGS. 12 and 13 (each schedule shown at constant nominal T) to be able to more clearly point out the relationships between the 3-D plots or surfaces formed by the parameter and the digital numbers N1, N2. It is, therefore, understood that the schedules from FIGS. 12 and 13 also vary with respect to temperature as the parameter itself varies with temperature.

Figure 3:
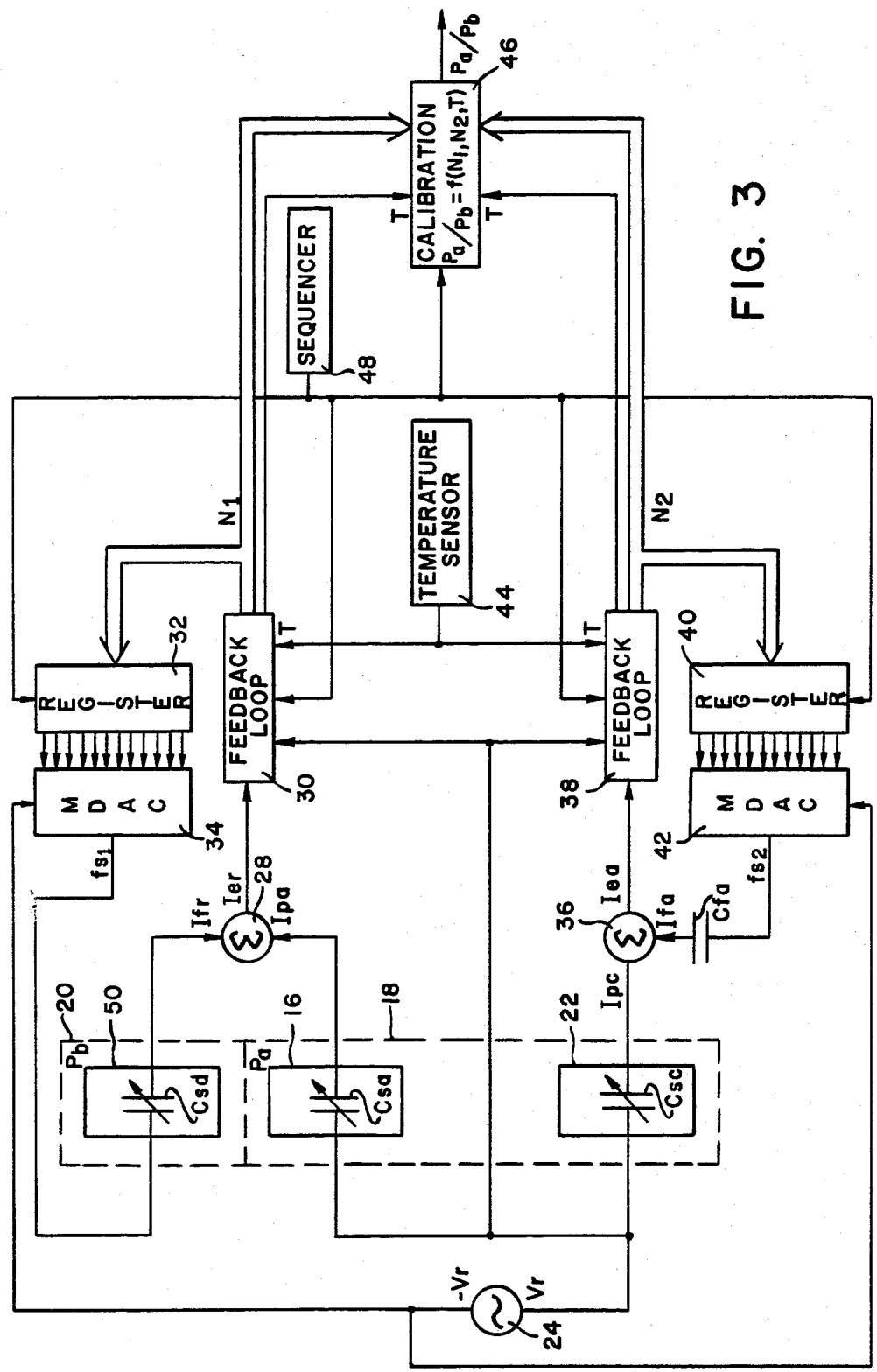
FIG. 3 is an electrical schematic view in block diagram form of a second embodiment of the pressure parameter measurement system illustrated in FIG. 1 which measures a pressure ratio.

FIG. 3 illustrates a second embodiment of the invention wherein the parameter measured is a pressure ratio Pa/Pb and is measured with respect to the absolute or common mode pressure Pa. For facility in description, identical elements have been labeled with the same reference numerals as used in FIG. 2. It is readily evident that a common mode pressure measurement loop included in this embodiment is identical to that described for the first embodiment and comprises elements 22, 24, 36, 38, 40, 42, and Cfa. These elements act under command of the sequencer 48 to operate in the manner previously described for nulling the error current Iea and generating a digital number N2 therefrom. The common mode pressure measurement loop therefore generates a digital number N2 which is representative of the common mode pressure Pa.

However, in this system the pressure parameter measurement loop has been changed to measure a different pressure parameter. In this regard, the capsule 26 previously located in chamber 20 has been replaced by another capsule 50 which contains a different pressure sensitive capacitor Csd. The pressure sensitive capacitor Csd in this embodiment takes the place of the fixed reference capacitor Cfd of the previous embodiment and is fed by the feedback signal fs1. In the configuration shown, a feedback current Ifr is proportional to the amplitude of the feedback sighal fs1 and the magnitude of the capacitance Csd which varies with the pressure Pb.

The transfer function in the steady state (error signal Fer nulled) for the pressure parameter measurement loop is Xf/Xm where Xf is the reactance or impedance configuration of the feedback loop and Xm is the reactance or impedance configuration of the measuring part. Consequently, the digital number N1 is proportional to Csa/Csd, and since Csa varies with Pa and Csd varies with Pb, then N1 is proportional to Pa/Pb Nmax.

Thus, the pressure parameter measurement loop of this embodiment calculates the ratio of the pressures Pa/Pb in a manner similar to that taught in the Antonazzi application. This ratio is then fed into the calibration circuit 46 as the digital number N1 and the digital number N2 is additionally input as a representation of the absolute pressure Pa. The calibration circuit 46 stores a calibration schedule as illustrated in FIG. 12. The calibration unit 46 thereafter outputs a signal indicative of the ratio Pa/Pb as a function of N1, N2, and T by the sequence described for FIG. 2.

Figure 4:
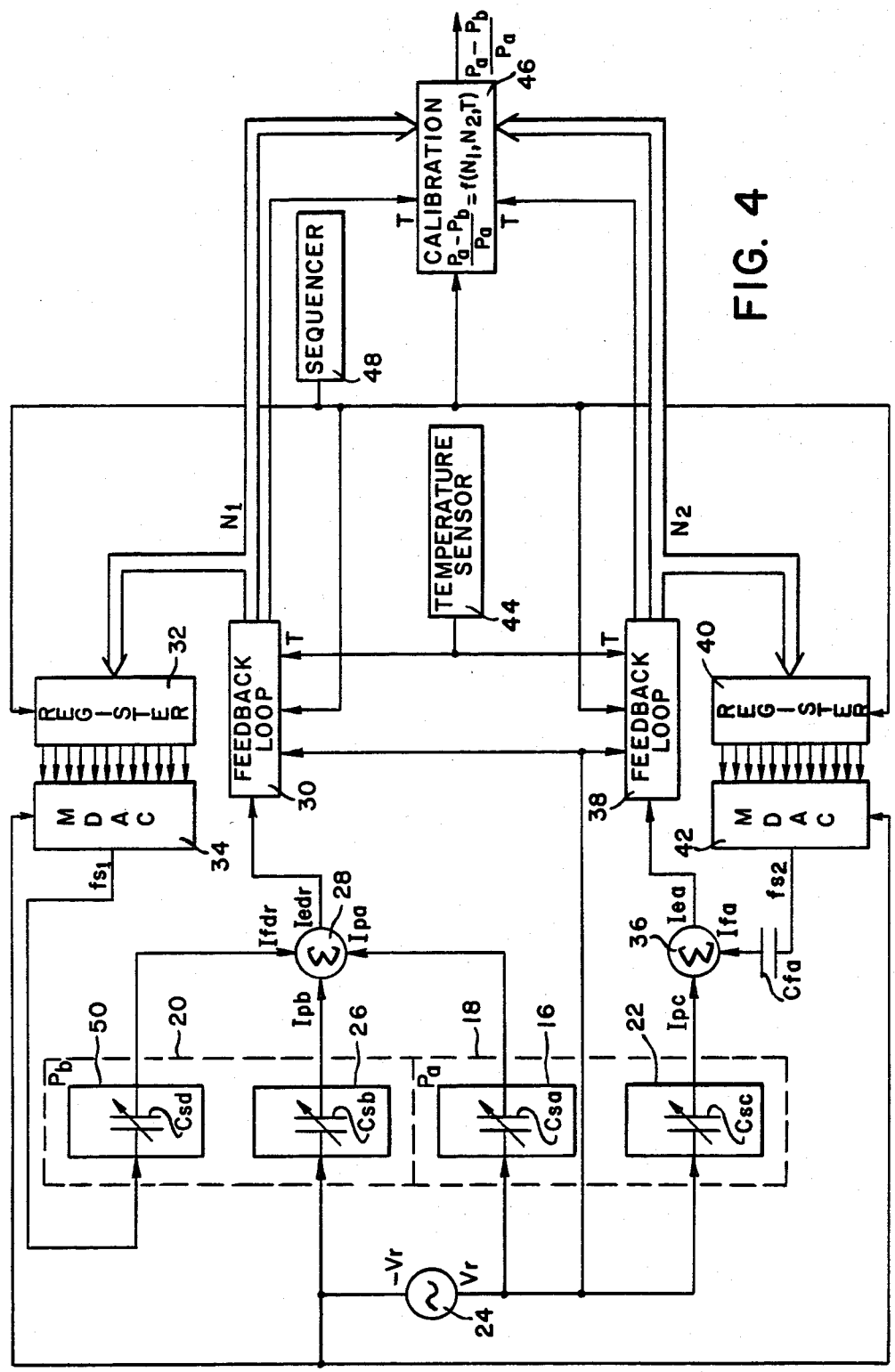
FIG. 4 is an electrical schematic view in block diagram form of a third embodiment of the pressure parameter measurement system illustrated in FIG. 1 which measures a differential pressure ratio.

If attention will now be directed to FIG. 4, a third embodiment of the invention will be more fully described. FIG. 4 illustrates a pressure measurement system wherein the differential ratio Pa-Pb/Pa is calculated from the configuration shown. For facility in description, identical elements have been labeled with the same reference numerals as used in FIG. 2. It is readily evident that a common mode pressure measurement loop included in this embodiment is identical to that described for the first embodiment and comprises elements 22, 24, 36, 38, 40, 42, and Cfa. These elements act under command of the sequencer 48 to operate in the manner previously described for nulling the error current Iea and generating a digital number N2 therefrom. The common mode pressure measurement loop therefore generates a digital number N2 which is representative of the common mode pressure Pa.

However, in this system the pressure parameter measurement loop has been changed to measure a different parameter. In this embodiment, the capsule 26 has been reintroduced into the pressure chamber 20 and is driven, as in FIG. 2, by the excitation $-Vr$. The output of the capsule 26 feeds the summing junction 28 with the current Ipb proportional to the pressure Pb. As was the case in the first two embodiments, the transfer function in the steady state for the pressure parameter measurement loop is Xf/Xm. Thus, N1 is proportional to (Csa-Csb)/Csd) Nmax. Since Csa varies with Pa, and Csb, Csd vary with Pb, then N1 is proportional to (Pa-Pb)/Pb.

The pressure parameter measurement loop generates a digital number N1 proportional to differential pressure ratio Pa-Pb/Pb which is input to the calibration unit 46. The calibration circuit stored a calibration schedule as is illustrated in FIG. 12. The calibration unit further receives the digital number N2 from the common mode pressure measurement loop and outputs under control of sequencer 48 a measurement signal indicative of the differential pressure ratio (Pa-Pb)/Pb as a function of N1, N2, and T by the sequence of events described for FIG. 2.

Figure 5:
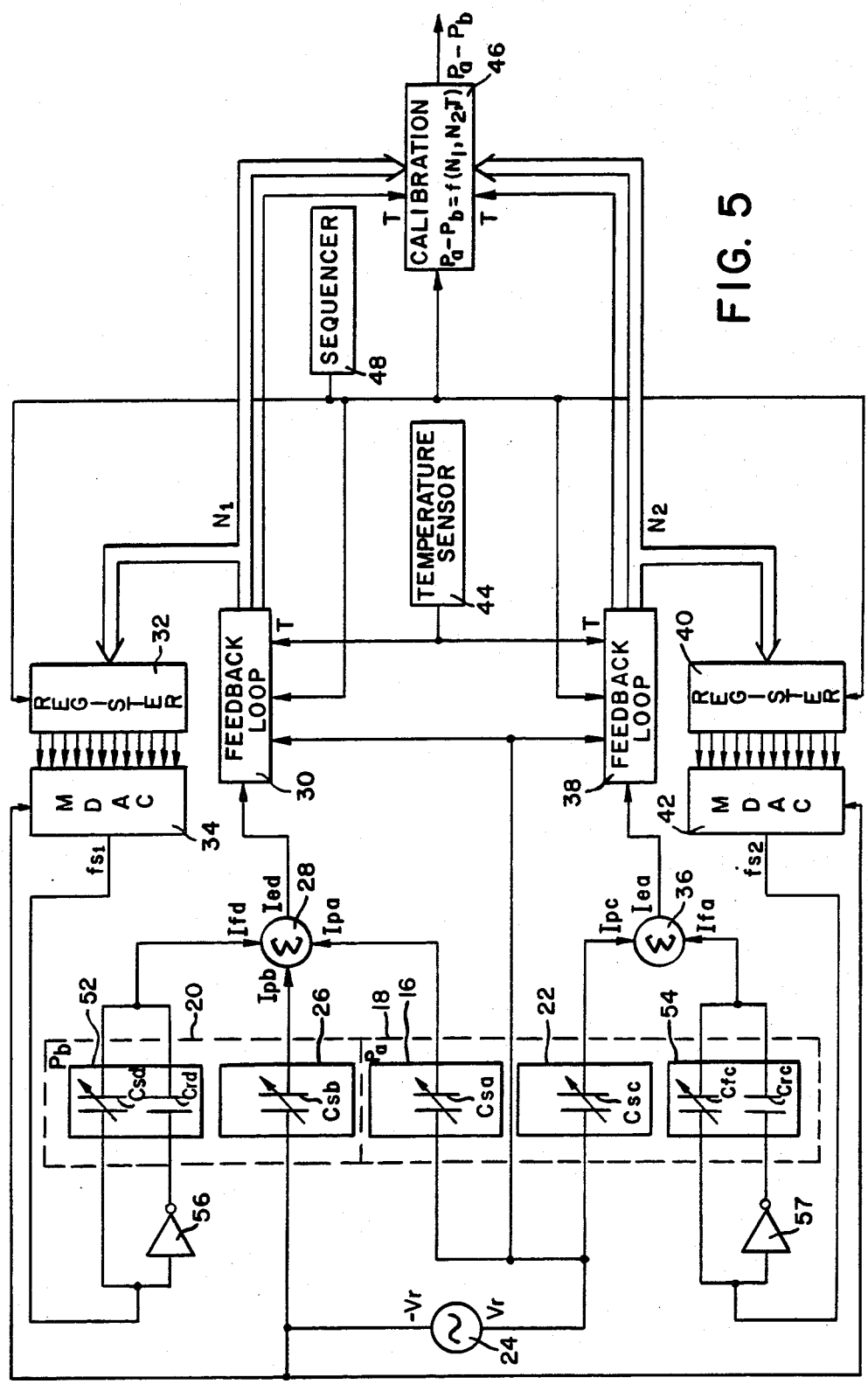
FIGS. 5, 6, and 7 are electrical schematic views in block diagram form of a second implementation for the first, second, and third embodiments illustrated in FIGS. 2, 3, and 4, respectively.

The illustration in FIG. 5 will now be used to describe a second implementation of the first embodiment described in FIG. 2. The system shown in FIG. 5 is similar to that in FIG. 2 and identical elements have been numbered with the same reference numerals used in FIG. 2. FIG. 5 illustrates a system wherein the fixed feedback capacitor Cfd has been replaced in the pressure parameter measurement loop by a capacitive transducer capsule 52 and the fixed reference capacitor Cfa in the common mode pressure measurement loop has been replaced by a capacitive transducer capsule 54.

The capsule 52 comprises a pressure sensitive capacitance Csd and a relatively pressure insensitive capacitor Crd. The pressure sensitive capacitance Cfd is fed by the feedback signal fs1 and the reference capacitor Crd is fed 180° out of phase by the feedback signal fs1 after it is inverted in an inverting amplifier 56. The feedback current Ifd is then proportional to the amplitude of the feedback signal fs1 and the difference of the capacitances Csd-Crd. This difference in capacitances is pressure dependent on Pb since the capsule 52 is located in the pressure chamber 20 and contains variable capacitor Csd. As was true for the first embodiment shown in FIG. 2 the pressure parameter measurement loop of this implementation provides a digital number N1 proportional to the differential pressure Pa-Pb. However, this differential pressure is divided by the feedback capacitance difference Csd-Crd to compress more of the digital numbers into the lower differential pressure ranges, as was taught in the Antonazzi et al. application.

The transducer capsule 54 comprises a pressure sensitive capacitance Cfc and a relatively pressure insensitive capacitance Crc, the outputs of which are combined to generate the feedback current Ifa. The pressure sensitive capacitance Cfc is fed by the feedback signal fs2, and the relatively pressure insensitive capacitance Crc is fed by the inversion of this signal from the inverting amplifier 57. The feedback current Ifa is therefore a function of the amplitude of the feedback signal fs2 and the difference of the capacitances Cfc-Crc.

The common mode pressure measurement loop (identical to that of FIG. 2 except for the inclusion of transducer 54) in this implementation calculates the digital number N2 as a function of the absolute pressure modified by the capacitive difference Cfc-Crc. The capacitive difference varies with the absolute pressure Pa such that the digital numbers N2 used to measure the absolute pressure Pa are compressed in the lower pressure ranges as taught in Sell et al. This optimizes the percentage of point accuracy of the absolute measurement and thus the total accuracy of the calibration.

The inclusion of the pressure sensitive feedback term in the pressure parameter measurement loop compresses more of the digital numbers N1 at the lower values of the parameter. The calibration schedule stored in calibration circuit 46 for this implementation is that illustrated in FIG. 13 which illustrates an increased slope for small values of the parameter and less of a slope for larger values of the parameter.

The common mode pressure measurement loop can additionally provide a compression of the digital numbers N2 along the abscissa of the schedule shown in FIG. 13 by the inclusion of the pressure sensitive feedback terms Cfc-Crc. However, a preferable method is to calibrate the digital number N2 as a function of Pa and then use the calibration in FIG. 12, or 13 with Pa. The schedules will thus store the pressure parameter as a function of N1, the common mode pressure (not N2), and T.

As was the case with the first embodiment, the second implementation of the first embodiment transmits the digitial numbers N1 and N2 to the calibration circuit 46 which outputs the differential pressure Pa-Pb as a function of N1, N2, and T by the sequence of events described in FIG. 2.

Figure 6:
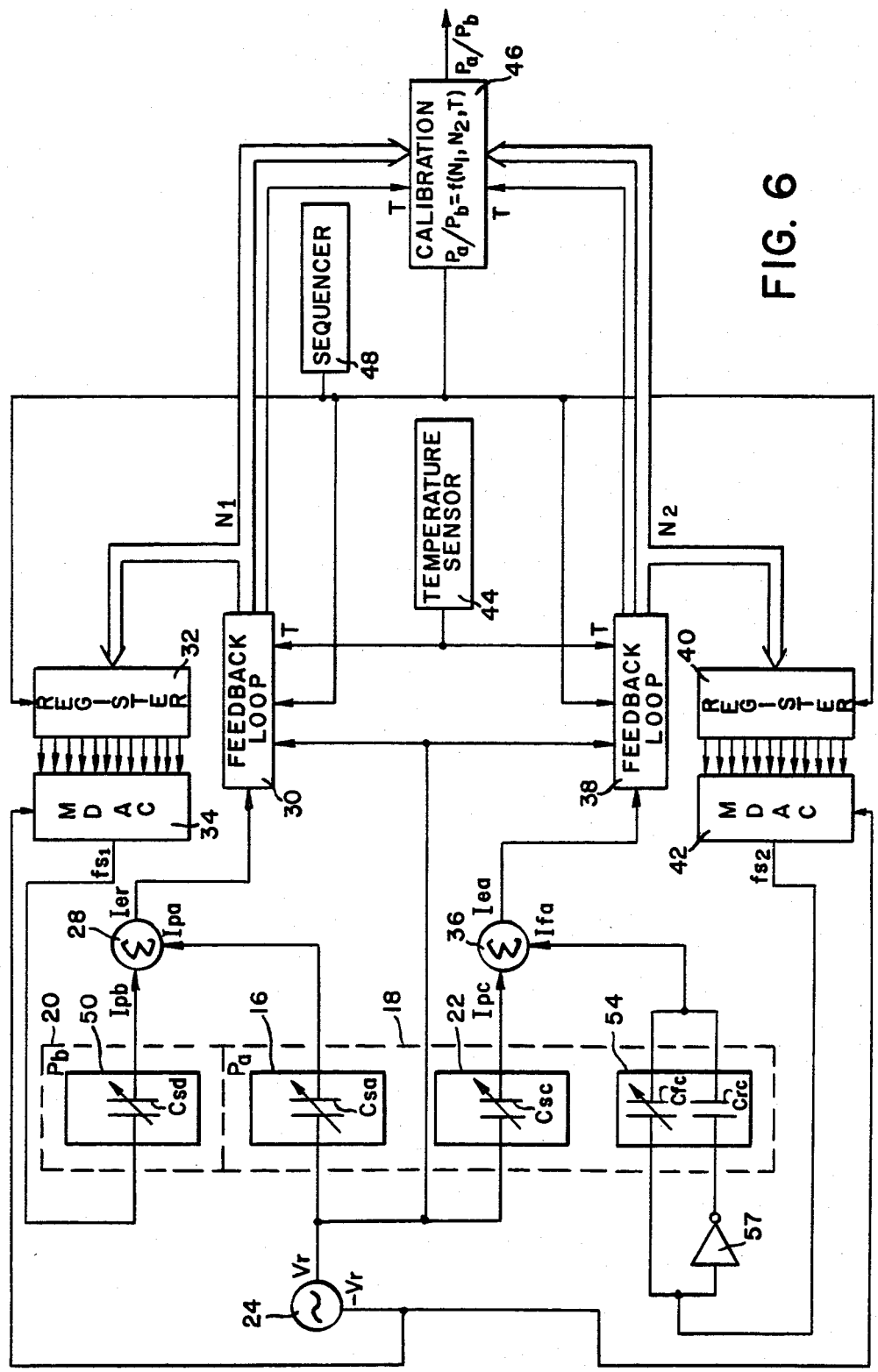

FIG. 6 shows a second implementation of the second embodiment of the pressure measurement system illustrated in FIG. 3. The system shown in FIG. 6 is similar to that in FIG. 3 and similar elements have been numbered with the same reference numerals. In this system the capacitive transducer capsule 54 has replaced the fixed feedback capacitor Cfa. As was the case for the feedback capsule 54 in the second implementation of the first embodiment, the feedback capsule 54 provides a feedback current Ifa which is a function of the amplitude of the second feedback signal fs2 and of the difference in capacitances Cfc-Crc. The common mode pressure measurement loop of this system therefore generates the digital number N2 as a function of the absolute pressure Pa and the difference of the capacitances Cfc-Crc. As was taught in the reference Sell et al. application, this provides a compression of the digital numbers N2 at the lower pressure values of the absolute pressure (Pa).

A pressure parameter measurement loop comprising elements 16, 24, 28, 30, 32, 34, and 50 is identical to that found for the embodiment in FIG. 3 and operates in the same manner. The pressure parameter measurement loop in this implementation therefore generates a digital number N1 proportional to the pressure ratio Pa/Pb.

The system in FIG. 6, therefore, transmits the digital numbers N1 and N2 to the calibration circuit 46 where the pressure ratio Pa/Pb is output as the function of N1, N2, and T by the sequence of events described for FIG. 2.

Figure 7:
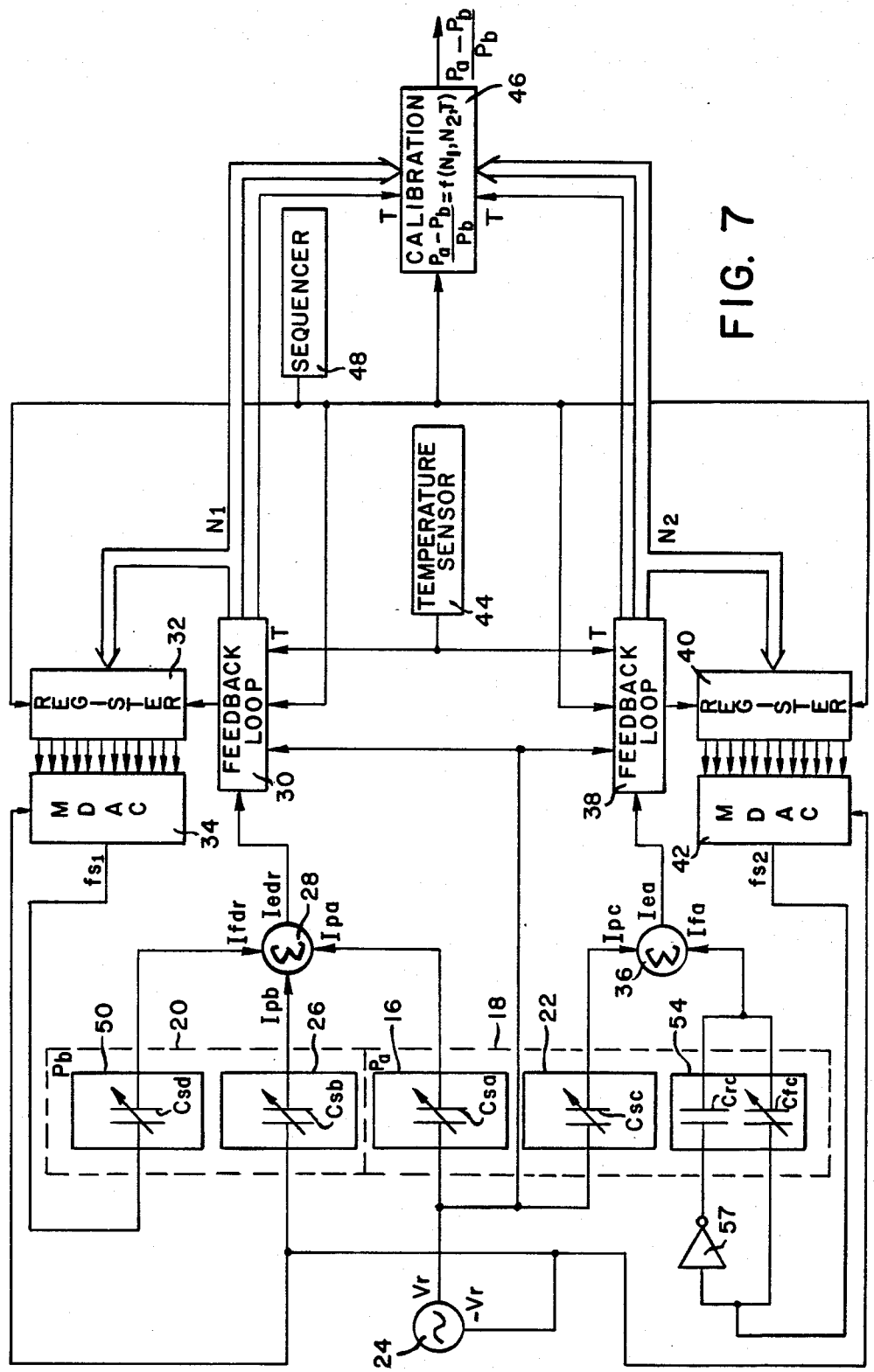

FIG. 7 is a second implementation of the third embodiment of the pressure measuring system illustrated in FIG. 4. Similar elements in these systems have been numbered with the same reference numerals. As was the case in the second implementations of the first and second embodiments, the common mode measurement loop replaces the fixed feedback capacitor Cfa with the capacitive transducer capsule 54. As was discussed previously, this allows the measurement loop to generate the feedback current Ifa as a function of the amplitude of the feedback signal fs2 and the difference in capacitances Cfc and Crc. The digital number N2 generated by the feedback loop 38 is therefore a function of the absolute pressure Pa and the difference in the capacitances Cfc-Crc.

A pressure parameter measurement loop comprising elements 16, 24, 26, 28, 32, 34, and 50 is identical to that found for the embodiment in FIG. 4 and operates in the same manner. The pressure parameter measurement loop in this implementation, therefore, generates a digital number N1 proportional to the differential pressure ratio Pa-Pb/Pb.

The system in FIG. 7 transmits the digital numbers N1 and N2 to the calibration circuit 46 where the differential pressure ratio (Pa-Pb)/Pb is output as a function of N1, N2, and T by the sequence of events described for FIG. 2.

Figure 8:
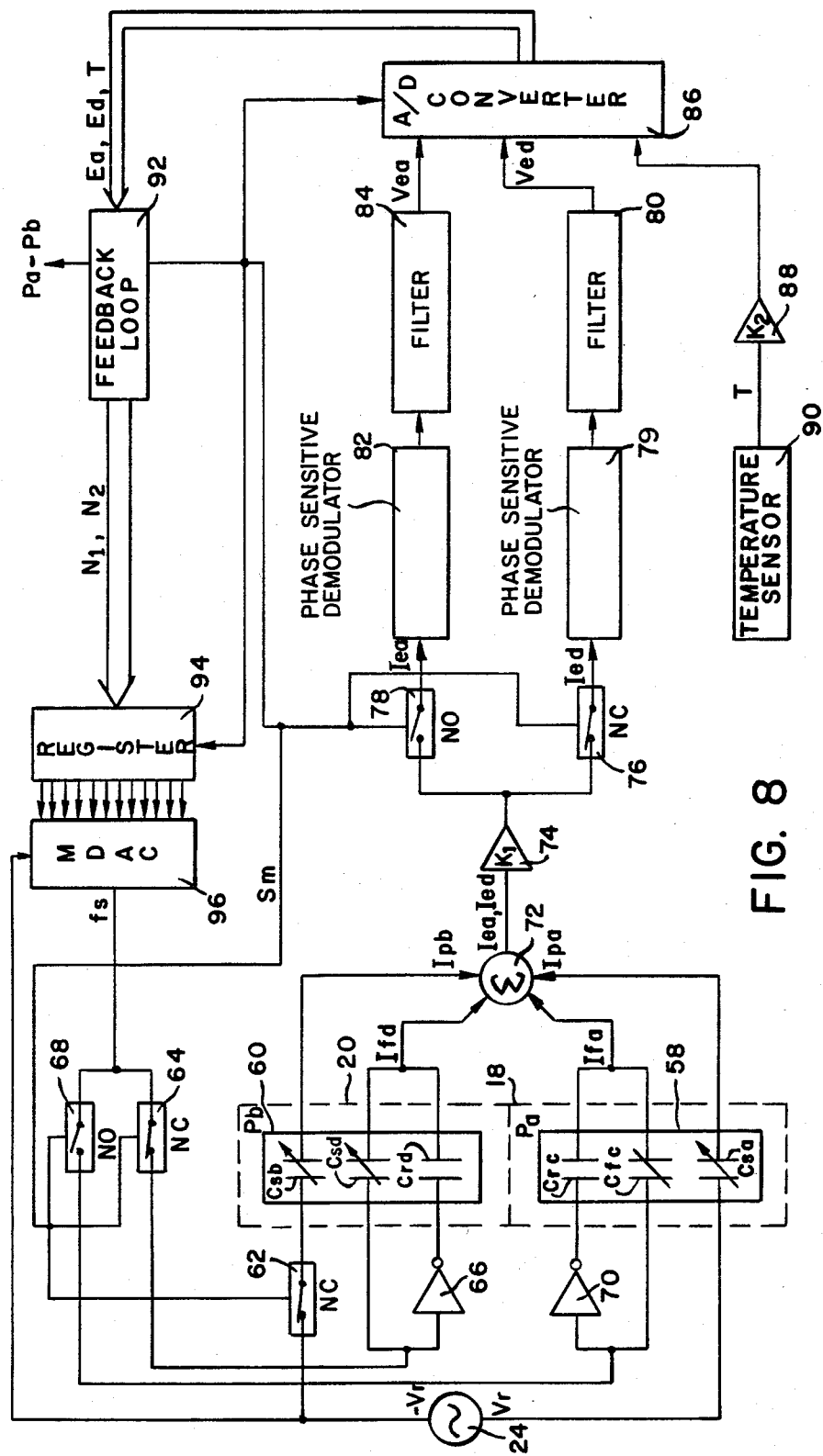
FIGS. 8, 9 and 10 are electrical schematic views in block diagram form of a third implementation for the first, second, and third embodiments illustrated in FIGS. 2, 3, and 4, respectively.

From the second implementation of the first embodiment of the pressure measuring system illustrated in FIG. 5 it is seen that it is necessary to provide five quartz capacitive capsules to produce the desired output parameter at the accuracy available from the system. FIG. 8 is a pressure measurement system that accomplishes the same task as the implementation in FIG. 5 with only two pressure transducers. A reduction in the number of pressure transducers is provided by combining the necessary pressure sensitive capacitances used in the former system into one transducer for each pressure chamber and the judicious switching of excitations and feedback to those pressure sensitive capacitors by means of a switching network. In this manner the feedback loops can further be reduced to a single loop and the multiplexing of common elements used to generate the pressure parameter signal N1 and the common mode pressure signal N2 from a single set of components.

In this implementation, a capacitive transducer capsule 58 contains two pressure sensitive capacitors Csa and Cfc, respectively, and a relatively pressure insensitive capacitor Crc. The capsule 58 is mounted in the pressure chamber 18 which has communicated to it the pressure Pa. Similarly, a capacitive transducer capsule 60 is included in the system which contains two pressure sensitive capacitances Csb, Csd, respectively, and a relatively pressure insensitive capacitance Crd. From inspection, it is evident from FIG. 5 that these two capsules contain the equivalent pressure sensitive and reference capacitors needed to generate the differential pressure parameter with the increased accuracy of which the previous system was capable.

The pressure sensitive capacitance Csa will be multiplexed to first generate the current Ipa for the digital number N1 representative of the differential pressure and thereafter be used to generate the current Ipc for the absolute pressure Pa from the chamber 18. Accordingly, the pressure sensitive capacitor Csa is fed by the excitation Vr directly and the pressure sensitive capacitance Csb is fed by the excitation −Vr through a normally closed switch 62. Thus, the system generates the currents Ipa, Ipc proportional to the capacitance of Csa or pressure Pa and the current Ipb proportional to the capacitance of Csb or pressure Pb.

The pressure sensitive capacitance Csd is fed by the feedback signal fs through a normally closed switch 64 while the reference capacitance Crd is fed from the inversion of this signal by means of an inverting amplifier 66. The outputs of the capacitors Crd, Csd are combined to form the feedback current Ifd proportional to the amplitude of the feedback signal fs and the difference in the capacitances Cfd-Crd. In a similar manner the pressure sensitive capacitance Cfc is fed by the feedback signal fs through a normally open switch 68 and the reference capacitor Crc is fed by the inversion of that signal by means of an inverting amplifier 70. The outputs of the capacitances Crc, Cfc are combined to form the current Ifa input to the summing junction 72.

Depending on the operation of the switches 62, 64, and 68, the currents Ipa, Ipb, and Ifd generate the error signal Ied while the currents Ipc and Ifa generate the error current Iea. The error currents Iea and Ied are transmitted to a current to voltage amplifier 74 which has a dual output through a normally closed switch 76 and a normally open switch 78. The current Ied is fed into a phase sensitive demodulator 79 which transforms the alternating voltage from the amplifier 71 into a DC signal. The DC signal is subsequently input to a filter 80. The DC signal voltage Ved which is representative of the error current Ied is input to the one port of an A/D converter 86. Similarly, the error current Iea is transmitted through the switch 78 where it is fed to a demodulator 82 which transforms it into a DC voltage whose amplitude is proportional to the error. Subsequently, the error voltage is filtered by filter 84 before its input to a second port of the A/D converter 86 as Vea. A third port of the A/D converter 86 receives the temperature signal T from a temperature sensor 90 after being amplified by a voltage amplifier 88 with a gain of K2.

The three inputs to the A/D converter 86 are converted into digital numbers Ea, Ed, and T and transmitted to a feedback loop 92. The feedback loop 92 integrates the error signals Ea and Ed to output the digital numbers N1 and N2 to a register 94. The digital numbers N1 and N2 are further transmitted to a calibration routine within loop 92 to output the differential pressure Pa-Pb as will be more fully explained hereinafter. The digital numbers N1 and N2 are transferred to the register 94 and thereafter control the gain of a multiplying digital analog converter (MDAC) 96. The MDAC generates the feedback signal fs from an input of the excitation −Vr and varies in the amplitude of that feedback signal dependent upon the digital number in the register 94.

In operation the circuitry in the feedback loop 92 controls the system shown in FIG. 8 to operate in a manner similar to that system shown in FIG. 5. The system comprises a pressure parameter measurement loop wherein a mode control signal Sm is zero and switches 62, 64, and 76 are closed while switches 68 and 78 are open. The mode control sisgnal is input along a common line to the control inputs of switches 62, 64, 68, 76, 78. In the zero mode the excitation Vr to capacitance Csa and −Vr to capacitance Csb generates the error current signal Ied to the amplifier 71 which is fed through the closed switch 76 to become the error voltage Ved at the input to the A/D converter 86. The A/D converter transforms the voltage Ved into the digital number Ed and the feedback loop generates the digital number N1 to the register 94. The feedback signal fs generated from the digital number N1 is fed back through the normally closed switch 64 to cpacitances Csd and Crd to become the error current Ifd. In this manner the digital number N1 is generated proportional to the differential pressure (Pa-Pb) as the first measurement loop is nulled.

The mode signal will then become high opening switches 62, 64, and 76 and the closing switches 68 and 78. In this mode of operation the excitation Vr generates the current Ipa from the capacitance Csa to the summing junction 72. The error current Iea passes through the amplifier 74, the closed switch 78, the demodulator 82, and filter 84 to become the error voltage Vea input to A/D converter 86. The A/D converter 82 converts the error voltage Vea into the digital error number Ea which the feedback loop 92 integrates into the digital number N2. The digital number N2 is output to the register 94 to generate the feedback signal fs through the now closed switch 68 to capacitances Cfc and Crc. These capacitances generate the feedback current Ifa to null the common mode pressure measurement loop. In this manner the absolute pressure Pa is measured in the same manner as that described in FIG. 5. Once the digital numbers N1 and N2 have been formed, the calibration of Pa-Pb as a function of the common mode pressure Pa can be made in the manner similar to that described herein previously.

Figure 17:
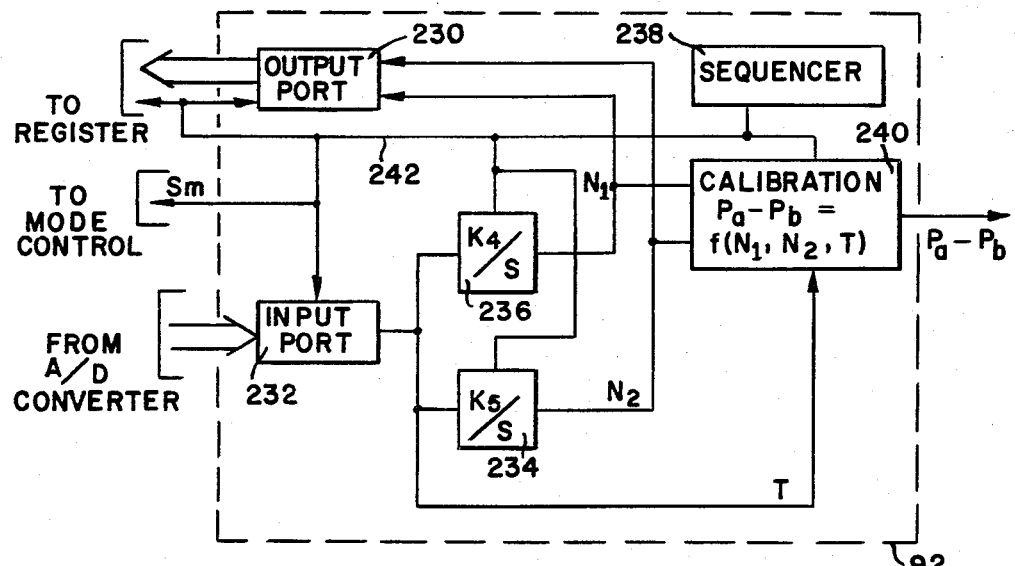
FIG. 17 is a system block diagram of the feedback loop illustrated in FIGS. 8-10.

To more particularly point out the operation of the feedback loop 92, reference is now directed to FIG. 17 where a detailed block diagram of that circuit is illustrated. The feedback loop comprises in its preferred form a microprocessor with an input port 232 which communicates the digital numbers from the A/D converter to an integrator 236 with a proportional gain of K4, an integrator 234 with a proportional gain of K5, and a calibration circuit 240, respectively. The output of the integrator 236 or N1 is transmitted to the calibration circuit via an internal bus of the processor and likewise to an output port 230 where it is later received by the register 94. Similarly, the output of the integrator 234 or N2 is transmitted to the calibration circuit 240 and the output port 230. The sequencing and timing of the data transfers is under the control of a stored program sequencer 238 which communicates via bus 242 with the ports 230, 232, the integrators 234, 236, the calibration circuit 240, the register 94, and the switches 62, 64, 68, 76, 78. The sequencer also provides the mode signal Sm either through the output port or a separate line.

The program stored for the sequencer 238 is similar to the previous sequencer program and is illustrated in block diagram form in FIG. 18. A request signal begins the measurement by entering the program at block 242. The program then sets the mode signal to a digital 0, thereby assuring switches 62, 64 are closed and switch 68 is open. The program then calls the NULL LOOP routine in block 246 to calculate N1. This is accomplished by varying the feedback current Ifd proportional to digital number N1 in integrator 236 until it nulls the error current Ied.

After N1 is stored, the program switches the mode signal to a digital 1, thereby opening switches 62, 64 and closing switch 68. The system is now ready to calculate the number N2 and does so by calling the NULL LOOP subroutine in block 250. Once the digital numbers N1, N2 have been calculated, the program steps 252-258 are identical to those described for execution in blocks 172-178 in FIG. 15.

Figure 9:
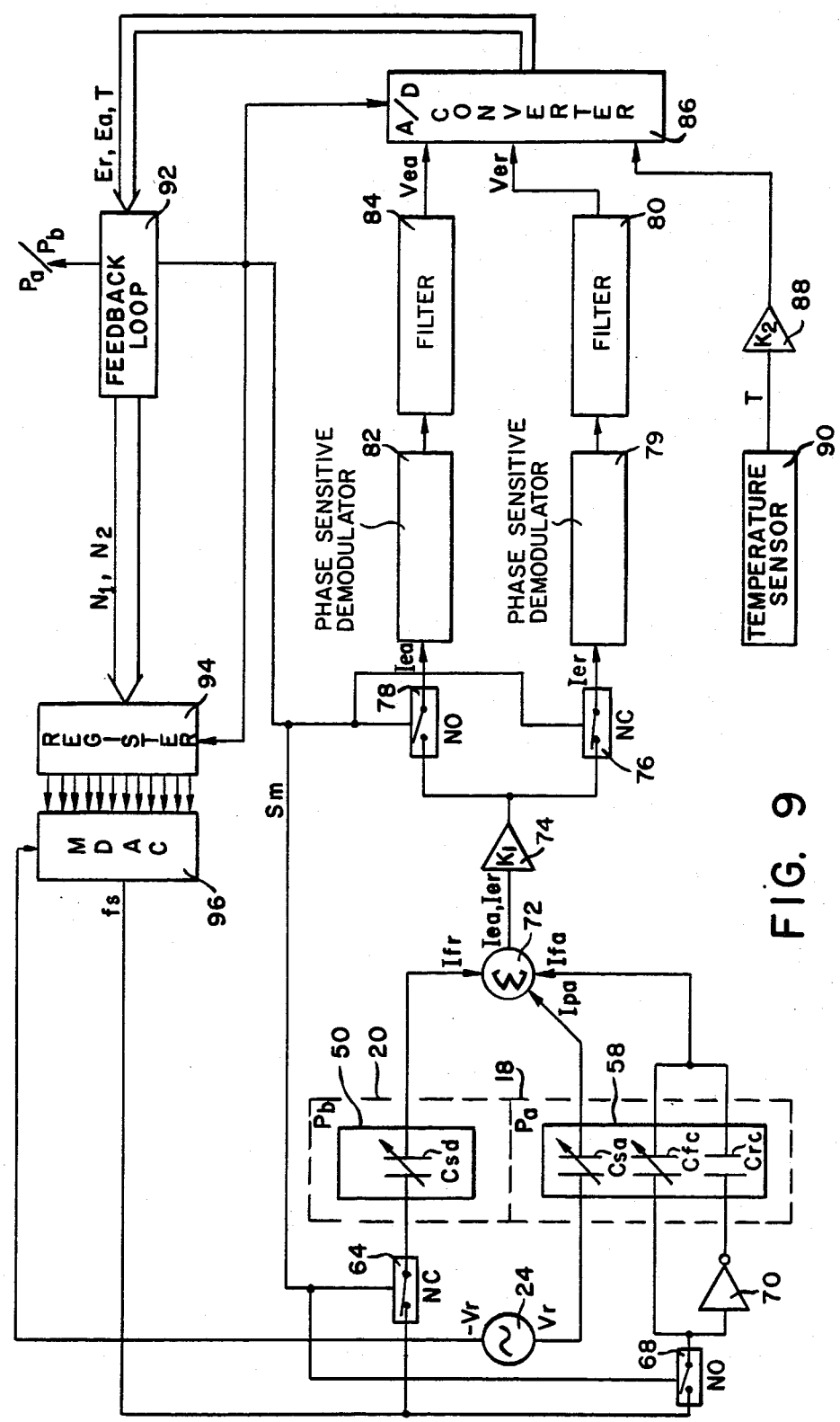

Just as the second implementation of the first embodiment is reduced by means of a switching network, so also can the second implementation of the second embodiment be reduced by a similar switching network as is illustrated in FIG. 9. Similar elements have been referenced with identical numerals as those used in previous embodiments. This Figure shows the reduction in circuitry where the pressure capsule 58 is now located in the chamber 18 and the pressure capsule 50 is located in the pressure chamber 20. The pressure sensitive capacitor Csa is fed by the excitation Vr while the pressure sensitive capacitor Cfc is fed by the feedback signal fs through normally open switch 68. The reference capacitor Crc is fed by the inversion of the signal through the inverting amplifier 70. The pressure sensitive capacitor Csa generates a current Ipa proportional to the capacitance and hence pressure Pa. Additionally, Csa provides current Ipc proportional to pressure Pa. The capacitances Cfc, Crc generate the feedback current Ifa proportional to the differences in the capacitances Cfc-Crc and the amplitude of the feedback signal fs.

The pressure sensitive capacitor Csd is fed by the feedback signal fs through a normally closed switch 64. It generates the feedback current Ifr proportional to the capacitance Csd and the amplitude of the feedback signal fs. The mode control signal Sm controls the conductivity of switches 62 and 68 by changing states to either a digital to either a one or a zero. When the mode control signal Sm is a zero, switch 68 is open and switch 62 is closed and when the signal is a one the opposite states occur.

Therefore, this system generates a pressure measurement parameter ratio Pa/Pb as a function of the absolute pressure Pa by having two loops. The first or the pressure parameter measurement loop is operated when the mode control signal Sm is zero and switch 64 is closed. In this mode, the current Ipa minus the feedback current Ifr generates the error current Ier to be integrated and nulled by the feedback loop 92. When the mode control signal Sm is a 1, switch 62 opens and switch 68 closes to provide the error current Iea which is the difference between the input currents Ipc and Ifa. The error current Iea is nulled by the second or common mode pressure measurement loop in the manner similar to that taught in FIG. 8.

Figure 10:
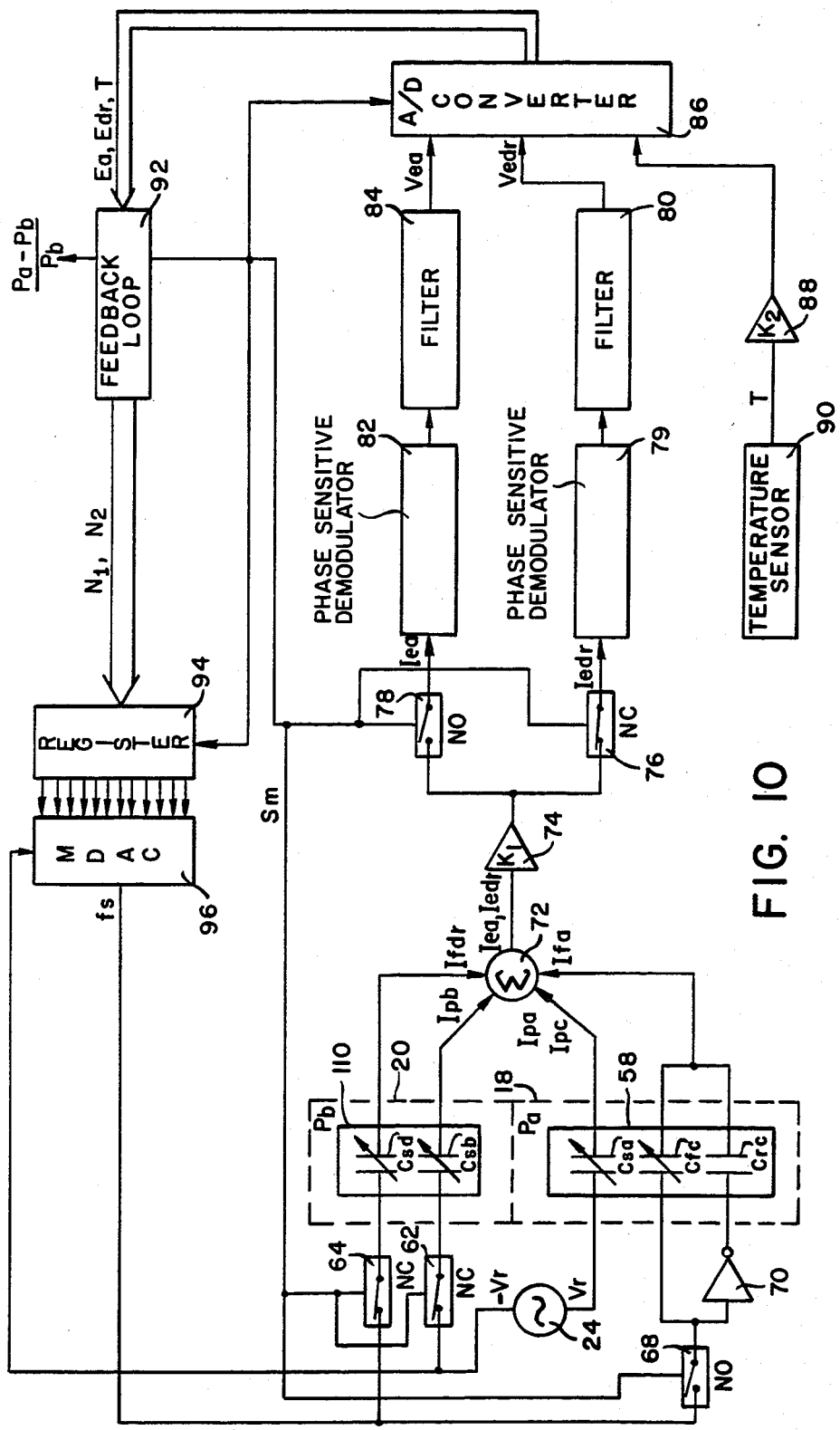

With reference now to FIG. 10, there is shown a pressure measurement system for measuring the differential pressure ratio Pa-Pb/Pb as a function of the absolute pressure Pa in a reduced form. Similar elements have been referenced with identical numerals as those used in previous embodiments. This implementation operates in the same manner as the second implementation of the third embodiment illustrated in FIG. 7. The pressure capsule 58 has been placed in the pressure chamber 20 and a pressure capsule 110 has been placed in the pressure chamber 18. The pressure capsule 110 contains two pressure sensitive capacitances Csb and Csd which are the combination of the two capsules found in the pressure chamber 18 in FIG. 7.

Pressure sensitive capacitor Csa is fed by excitation Vr while pressure sensitive capacitor Cfc is fed by the feedback signal fs through the normally open switch 68. The feedback signal fs also is supplied to the reference capacitor Crc through the normally open switch by means of an inverting amplifier 70. The pressure sensitive capacitance Csa generates the currents Ipa, Ipc proportional to its capacitance while the capacitance Cfc, Crc generates the feedback current Ifa proportional to the difference in the capacitances Cfc-Crc and the amplitude of feedback signal fs.

The capacitance Csb is fed by the excitation $-Vr$ through the normally closed switch 62 while the capacitance Csd is fed by the feedback signal fs through the normally closed switch 64. The capacitance Csb generates the current Ipb as a function of its capacitance while the capacitance Csd generates the feedback current Ifd as a function of its capacitance and the amplitude of the feedback signal fs. The mode control signal Sm controls the state of switches 62, 64, 68, such that 62, 64, are closed and switch 68 is open when the mode control signal is a 0 and switches 62, 64 are open and switch 68 is closed when the mode control signal is 1.

The operation of the system shown in FIG. 10 is similar to that of the previous systems in that it contains two measurement loops wherein the first loop is activated by the mode control signal being zero and the currents Ipa, Ipb, and Ifd generate the error signal Iedr to the feedback loop 92. The feedback loop generates the digital number N1 representative of the differential pressure ratio (Pa-Pb)/Pb when the error current Iedr is nulled.

The mode control then generates a logic one signal opening switches 62 and 64 and closing switch 68 such that currents Ipc and Ifa are combined in the summing junction to generate the current Iea. The current Iea is integrated and nulled to zero in the feedback loop 92 and forms the digital number N2 proportional to Pa when the loop is nulled.

A similar calibration to that previously described for the systems, can then generate the differential ratio (Pa-Pb)/Pb as a function of the digital number N1 of the pressure parameter measurement loop, the digital number N2 of the common mode pressure measurement loop, and the temperature T.

While a detailed description of the preferred embodiments has been disclosed, it will be obvious to those skilled in the art that various modifications and changes may be made thereto without departing from the scope and spirit of the invention as hereinafter defined in the appended claims.

What is claimed is:

1. A pressure measuring system comprising first pressure sensing means for sensing a first pressure, second pressure sensing means for sensing a second pressure, means responsive to said first and second pressure sensing means for generating first and second pressure signals, means responsive to the first and second pressure signals, for generating a combining signal representing a combined variable which varies as a function of both said first and second pressure measurement signals, common mode sensing means for sensing said first pressure, common mode signal generating means responsive to said common mode sensing means for generating a common mode signal as a function of said first pressure, and calibration means responsive to said combining signal and said common mode signal for calibrating the combining signal as a function of the value of said common mode signal.

2. A pressure measurement system as defined in claim 1, wherein:
said combining signal is a function of the differential pressure Pa-Pb, where Pa is said first pressure and Pb is said second pressure.

3. A pressure measurement system as defined in claim 1, wherein:
said combining signal is a function of the pressure ration Pa/Pb where Pa is said first pressure and Pb is said second pressure.

4. A pressure measurement system as defined in claim 1, wherein:
said combining signal is a function of the differential pressure ratio Pa-Pb/Pb where Pa is said first pressure and Pb is said second pressure.

5. A pressure measurement system as defined in claim 1, wherein:
said combining signal varies within a predetermined range for each value of said common mode signal.

6. A pressure measurement system as defined in claim 5, wherein:
said calibration means includes means for calibrating each combining signal range over the maximum and minimum values of the combining signal.

7. A pressure measuring system as defined in claim 1, wherein:
said means for generating the combining signal includes a closed loop system having means for generating an error signal as the difference between an input signal and a feedback signal, and means for varying the feedback signal as the time integral of the error signal until the error signal is zero, wherein the integral of the error signal is proportional to the input signal and is the combining signal.

8. A pressure measuring system as defined in claim 7, wherein:
said input signal is generated by applying a first reference signal to said first pressure sensing means and a second reference signal 180° out of phase with said first reference signal to said second pressure sensing means, said first and second pressure sensing means comprising a plurality of pressure sensitive impedances forming an input impedance configuration; and
said feedback signal is generated by applying said second reference signal 180° out of phase with said first reference signal to a third impedance forming a feedback impedance configuration.

9. A pressure measuring system as defined in claim 8, wherein:
said first pressure sensing means includes a first pressure sensitive capacitance, responsive to said first pressure, fed by said first reference signal and said second pressure sensing means includes a second pressure sensitive capacitance, responsive to said second pressure, fed 180° out of phase from said first reference signal, the output of said capacitances being combined and forming said input signal as a current proportional to the difference between said first pressure and said second pressure; and said feedback impedance configuration includes a substantially invariable feedback capacitor fed by said second reference signal forming said feedback signal as a current proportional to the value of the feedback capacitor and the amplitude of said second reference signal.

10. A pressure measuring system as defined in claim 9, wherein:

said common mode signal generating means is a closed loop system having means for generating a common mode error signal as the difference between a second input signal and a second feedback signal, and means for varying the second feedback signal as the time integral of the common mode error signal until the latter is zero.

11. A pressure measuring system as defined in claim 10, wherein:

said second input signal is generated by applying said first reference signal to a third pressure sensitive capacitance, responsive to said first pressure, forming said second input signal as a current proportional to said first pressure;

said second feedback signal is generated by applying said second reference signal to a substantially invariable second feedback capacitance, forming said second feedback signal as a current proportional to the values of said second feedback capacitance and the amplitude of said second reference signal.

12. A pressure measuring system as defined in claim 10, wherein:

said second input signal is generated by applying said first reference signal to a fourth pressure sensitive capacitance, responsive to said first pressure, forming said second input signal as a current proportional to said first pressure;

said second feedback signal is generated by applying said second reference signal to a substantially invariable second feedback capacitance, and applying a signal 180° out of phase with said second reference signal to a fifth pressure sensitive capacitance, responsive to said first pressure, such that said second feedback signal is formed as a current proportional to the difference of said fifth capacitance and said second feedback capacitance.

13. A pressure measuring system as defined in claim 8, wherein:

said first and second pressure sensing means includes a first pressure sensitive capacitance, responsive to a first pressure, fed by said first reference signal and a second pressure sensitive capacitance, responsive to a second pressure, fed 180° out of phase from said first reference signal, the outputs of said capacitances being combined and forming said input signal as a current proportional to the difference between said first pressure and said second pressure; and said feedback impedance configuration includes a third pressure sensitive capacitance, responsive to said second pressure, fed by said second reference signal forming said feedback signal as a current proportional to said second pressure and the amplitude of said second reference signal.

14. A pressure measurement system as defined in claim 13, wherein:

said common mode signal generating means is a closed loop system having means for generating a common mode error signal as the difference between a second input signal and a second feedback signal, and means for varying the second feedback signal as the time integral of the common mode error signal until the latter is zero.

15. A pressure measurement system as defined in claim 14, wherein:

said second input signal is generated by applying said first reference signal to a fourth pressure sensitive capacitance, responsive to said first pressure, forming said second input signal as a current proportional to said first pressure;

said second feedback signal is generated by applying said second reference signal to a substantially invariable second feedback capacitance, forming said second feedback as a current proportional to the values of said second feedback capacitance and the amplitude of said second reference signal.

16. A pressure measurement system as defined in claim 14, wherein:

said second input signal is generated by applying said first reference signal to a fourth pressure sensitive capacitance, responsive to said first pressure, forming said second input signal as a current proportional to said first pressure;

said second feedback signal is generated by applying said second reference signal to a substantially invariable second feedback capacitance, and applying a signal 180° out of phase with said second reference signal to a fifth pressure sensitive capacitance, responsive to said first pressure, such that said feedback signal is formed as a current proportional to the difference of said fifth capacitance and said second feedback capacitance.

17. A pressure measuring system as defined in claim 8, wherein:

said first and second pressure sensing means includes a first pressure sensitive capacitance, responsive to said first pressure, fed by said first reference signal and second pressure sensitive capacitance, responsive to said second pressure, fed 180° out of phase from said first reference signal, the outputs of said capacitances being combined and forming said input signal as a current proportional to the difference between said first pressure and said second pressure; and said feedback impedance configuration includes a third pressure sensitive capacitance, responsive to said second pressure, fed by said second reference signal and a relatively invariable reference capacitance fed 180° out of phase from said second reference signal, the outputs of the third and reference capacitances being combined to form the feedback signal as a current proportional to the difference between said third capacitance and said reference capacitance.

18. A pressure measurement system as defined in claim 17, wherein:

said common mode signal generating means is a closed loop system having means for generating a common mode error signal as the difference between a second input signal and a second feedback signal, and means for varying the second feedback signal as the time integral of the common mode error signal until the latter is zero.

19. A pressure measurement system as defined in claim 18, wherein:
said second input signal is generated by applying said first reference signal to a fourth pressure sensitive capacitance, responsive to said first pressure, forming said second input signal as a current proportional to said first pressure;
said second feedback signal is generated by applying said second reference signal to a substantially invariable second feedback capacitance, forming said second feedback as a current proportional to the values of said second feedback capacitance and the amplitude of said second reference signal.

20. A pressure measurement system as defined in claim 18, wherein:
said second input signal is generated by applying said first reference signal to a fourth pressure sensitive capacitance, responsive to said first pressure, forming said second input signal as a current proportional to said first pressure;
said second feedback signal is generated by applying said second reference signal to a substantially invariable second feedback capacitance, and applying a signal 180° out of phase with said second reference signal to a fifth pressure sensitive capacitance, responsive to said first pressure, such that said second feedback signal is formed as a current proportional to the difference of said fifth capacitance and said second feedback capacitance.

21. A pressure measuring system as defined in claim 7, wherein:
said first pressure sensing means includes a first pressure sensitive capacitance responsive to said first pressure, fed by said first reference signal forming said input signal as a current proportional to said first pressure; and
said feedback impedance configuration includes said second pressure sensing means comprising a second pressure sensitive capacitance, responsive to said second pressure, fed by said second reference signal forming said feedback signal as a current proportional to said second pressure and the amplitude of said second reference signal;
wherein the error signal is proportional to the ratio of the first pressure to the second pressure.

22. A pressure measurement system as defined in claim 21, wherein:
said common mode signal generating means is a closed loop system having means for generating a comon mode error signal as the difference between a second input signal and a second feedback signal, and means for varying the second feedback signal as the time integral of the common mode error signal until the latter is zero.

23. A pressure measurement system as defined in claim 22, wherein:
said second input signal is generated by applying said first reference signal to a fourth pressure sensitive capacitance, responsive to said first pressure, forming said second input signal as a current proportional to said first pressure;
said second feedback signal is generated by applying said second reference signal to a substantially invariable second feedback capacitance, forming said second feedback as a current proportional to the values of said second feedback capacitance and the amplitude of said second reference signal.

24. A pressure measurement system as defined in claim 22, wherein:
said second input signal is generated by applying said first reference signal to a fourth pressure sensitive capacitance, responsive to said first pressure, forming said second input signal as a current proprotional to said first pressure;
said second feedback signal is generated by applying said second reference signal to a substantially invariable second feedback capacitance, and applying a signal 180° out of phase with said second reference signal to a fifth pressure sensitive capacitance, responsive to said first pressure, such that said second feedback signal is formed as a current proportional to the difference of said fifth capacitance and said second feedback capacitance.

* * * * *